(12) United States Patent
Kitagawa et al.

(10) Patent No.: US 8,993,673 B2
(45) Date of Patent: Mar. 31, 2015

(54) WATER-BASED COATING COMPOSITION AND METHOD OF FORMING MULTILAYERED COATING FILM

(75) Inventors: Hiroshi Kitagawa, Hiratsuka (JP); Munehiro Nakata, Hiratsuka (JP); Daisuke Takayama, Hiratsuka (JP); Tatsuya Azuma, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 777 days.

(21) Appl. No.: 13/201,953

(22) PCT Filed: Feb. 9, 2010

(86) PCT No.: PCT/JP2010/051899
§ 371 (c)(1),
(2), (4) Date: Aug. 17, 2011

(87) PCT Pub. No.: WO2010/095541
PCT Pub. Date: Aug. 26, 2010

(65) Prior Publication Data
US 2011/0300389 A1 Dec. 8, 2011

(30) Foreign Application Priority Data

Feb. 18, 2009 (JP) ................. 2009-035447
Jun. 24, 2009 (JP) ................. 2009-149567
Jul. 24, 2009 (JP) ................. 2009-172644

(51) Int. Cl.
*B05D 1/36* (2006.01)
*B05D 3/02* (2006.01)
(Continued)

(52) U.S. Cl.
CPC ............... *B05D 7/572* (2013.01); *B32B 27/40* (2013.01); *B32B 27/00* (2013.01); *C08G 18/3203* (2013.01); *C08G 18/44* (2013.01); *B05D 1/36* (2013.01); *B05D 3/02* (2013.01); *C08G 18/00* (2013.01); *C08G 18/66* (2013.01); *C08G 18/6225* (2013.01); *C08J 3/203* (2013.01); *C08J 3/205* (2013.01); *B32B 27/30* (2013.01); *C08J 3/00* (2013.01); *C08G 18/6511* (2013.01); *B32B 27/308* (2013.01); *C08J 2333/10* (2013.01); *B05D 2520/00* (2013.01); *B32B 2333/08* (2013.01); *B05D 2401/20* (2013.01); *B32B 2333/12* (2013.01); *C08J 2433/00* (2013.01); *C08J 2333/00* (2013.01); *C08J 2333/08* (2013.01); *C08J 2433/10* (2013.01); *B32B 2375/00* (2013.01); *B32B 2605/08* (2013.01); *C08J 2375/04* (2013.01);
(Continued)

(58) Field of Classification Search
CPC ............ B05D 1/36; B05D 3/02; B05D 7/572; B05D 2401/20; B05D 2420/01; B05D 2502/00; B05D 2503/00; B05D 2520/00; B32B 27/00; B32B 27/30; B32B 27/308; B32B 27/40; B32B 2250/03; B32B 2270/00; B32B 2333/08; B32B 2333/12; B32B 2375/00; B32B 2605/08; C08G 18/00; C08G 18/3203; C08G 18/44; C08G 18/6225; C08G 18/6511; C08G 18/66; C08G 18/6633; C08G 18/6659; C08J 3/00; C08J 3/203; C08J 3/205; C08J 2333/00; C08J 2333/08; C08J 2333/10; C08J 2375/04; C08J 2433/00; C08J 2433/08; C08J 2433/10; C08J 2475/00; C08J 2475/04; C08K 3/00; C08K 3/20; C08K 2003/20; C08L 75/00; C08L 75/04; C08L 33/00; C08L 33/08; C08L 33/10
USPC .......... 524/507, 591, 839, 840; 525/123, 455; 427/372.2, 385.5, 407.1; 428/423.1
See application file for complete search history.

(56) References Cited

U.S. PATENT DOCUMENTS 5,227,422 A * 7/1993 Mitsuji et al. ................. 524/457
5,525,670 A    6/1996 Nishi et al.
(Continued)

FOREIGN PATENT DOCUMENTS

JP    08-012925    1/1996
JP    08-209059    8/1996
(Continued)

OTHER PUBLICATIONS

International Search Report issued Mar. 16, 2010 in International (PCT) Application No. PCT/JP2010/051899.

*Primary Examiner* — Patrick Niland
(74) *Attorney, Agent, or Firm* — Wenderoth, Lind & Ponack, L.L.P.

(57) ABSTRACT

An object of the present invention is to provide an aqueous coating composition with excellent finished appearance and removability in bell cleaning, and a method for forming a multilayer coating film having excellent smoothness by a 3-coat-1-bake method including successively applying an aqueous first colored coating composition, an aqueous second colored coating composition, and a clear coating composition to a substrate, and heat-curing the resulting three layers of the multilayer coating film all at once. The present invention provides an aqueous coating composition containing an acrylic resin (A), a curing agent (B), and a urethane resin emulsion (C) with a weight average molecular weight of 2,000 to 50,000, the urethane resin emulsion (C) being prepared using constituent components containing a polyisocyanate component and a polyol component as starting materials, wherein the polyisocyanate component contains an alicyclic diisocyanate, and the polyol component contains a polycarbonate diol in an amount of 50 mass %, based on the total amount of the polyol component.

9 Claims, No Drawings

(51) Int. Cl.

| | | |
|---|---|---|
| *B05D 7/00* | (2006.01) | |
| *B32B 27/00* | (2006.01) | |
| *B32B 27/40* | (2006.01) | |
| *C08F 8/30* | (2006.01) | |
| *C08F 283/04* | (2006.01) | |
| *C08G 18/08* | (2006.01) | |
| *C08J 3/00* | (2006.01) | |
| *C08K 3/20* | (2006.01) | |
| *C08L 75/00* | (2006.01) | |
| *C08G 18/32* | (2006.01) | |
| *C08G 18/44* | (2006.01) | |
| *C08G 18/00* | (2006.01) | |
| *C08G 18/66* | (2006.01) | |
| *C08G 18/62* | (2006.01) | |
| *C08J 3/20* | (2006.01) | |
| *C08J 3/205* | (2006.01) | |
| *B32B 27/30* | (2006.01) | |
| *C08G 18/65* | (2006.01) | |
| *C09D 175/00* | (2006.01) | |
| *C09D 5/00* | (2006.01) | |
| *C09D 133/10* | (2006.01) | |
| *C08L 75/04* | (2006.01) | |
| *C09D 5/02* | (2006.01) | |
| *C08L 33/10* | (2006.01) | |
| *C09D 133/00* | (2006.01) | |
| *C09D 133/08* | (2006.01) | |
| *C08L 33/08* | (2006.01) | |
| *C08K 3/00* | (2006.01) | |
| *C08L 33/00* | (2006.01) | |
| *C08G 18/75* | (2006.01) | |
| *C08G 18/12* | (2006.01) | |
| *C09D 175/04* | (2006.01) | |

(52) U.S. Cl.
CPC ........ *C08J 2475/00* (2013.01); *B05D 2503/00* (2013.01); *B32B 2270/00* (2013.01); *C08J 2475/04* (2013.01); *B32B 2250/03* (2013.01); *B05D 2420/01* (2013.01); *B05D 2502/00* (2013.01); *C08J 2433/08* (2013.01); *C09D 175/00* (2013.01); *C09D 5/00* (2013.01); *C09D 5/002* (2013.01); *C08L 75/00* (2013.01); *C09D 133/10* (2013.01); *C08K 3/20* (2013.01); *C08L 75/04* (2013.01); *C09D 5/022* (2013.01); *C08L 33/10* (2013.01); *C09D 133/00* (2013.01); *C09D 133/08* (2013.01); *C08L 33/08* (2013.01); *C08K 3/00* (2013.01); *C08L 33/00* (2013.01); *C08G 18/6254* (2013.01); *C08G 18/6266* (2013.01); *C08G 18/6659* (2013.01); *C08G 18/758* (2013.01); *C08G 18/0823* (2013.01); *C08G 18/12* (2013.01); *C09D 175/04* (2013.01)
USPC ............... 524/507; 427/372.2; 427/385.5; 427/407.1; 428/423.1; 524/591; 524/839; 524/840; 525/123; 525/455

(56) References Cited

U.S. PATENT DOCUMENTS

| | | | |
|---|---|---|---|
| 6,054,508 | A | 4/2000 | Watanabe et al. |
| 6,824,834 | B2 * | 11/2004 | Schafheutle et al. ...... 427/388.2 |
| 2001/0033897 | A1 | 10/2001 | Magoshi et al. |
| 2004/0228975 | A1 | 11/2004 | Takesako et al. |
| 2005/0014885 | A1 | 1/2005 | Katsuta et al. |
| 2005/0082169 | A1 | 4/2005 | Katsuta et al. |
| 2006/0121204 | A1 | 6/2006 | Nakae et al. |

FOREIGN PATENT DOCUMENTS

| | | |
|---|---|---|
| JP | 2001-240791 | 9/2001 |
| JP | 2002-069166 | 3/2002 |
| JP | 2004-358462 | 12/2004 |
| JP | 2005-023303 | 1/2005 |
| JP | 2005-139437 | 6/2005 |
| JP | 2005-330339 | 12/2005 |
| JP | 2009-029942 | 2/2009 |
| WO | 96/01860 | 1/1996 |
| WO | 2005/075587 | 8/2005 |
| WO | 2007/145368 | 12/2007 |

* cited by examiner

WATER-BASED COATING COMPOSITION AND METHOD OF FORMING MULTILAYERED COATING FILM

TECHNICAL FIELD

The present invention relates to an aqueous coating composition with excellent finished appearance and a method for forming a multilayer coating film.

BACKGROUND ART

In recent years, environmental issues have become a great concern on a global scale. In the automotive industry, attempts for environmental protection in manufacturing processes have been actively promoted. In automotive manufacturing processes, problems such as global warming, industrial waste, and discharge of volatile organic compounds (VOC) have arisen. In particular, reduction of the amount of VOCs, most of which are mainly released during coating processes, has become an urgent task.

To impart corrosion resistance and a beautiful appearance, the outer panels of automobile bodies are usually coated with a multilayer coating film comprising an undercoat of a cationic electrodeposition coating composition, an intermediate coat, and a topcoat. In view of VOC reduction, use of water-based coating compositions is also promoted for intermediate and top coating compositions.

However, compared to organic solvent-based coating compositions, conventional aqueous coating compositions are unsatisfactory in finished appearance of the resulting coating films, due to water being used as the main solvent.

As an aqueous coating composition that has good coating workability and that can form a coating film with an excellent finished appearance, such as with excellent smoothness, Patent Literature 1 discloses a water-based coating composition consisting essentially of a specific acrylic and/or polyester resin, a specific polycarbonate resin, and a curing agent. However, such a water-based coating composition may provide an unsatisfactory finished appearance. Patent Literature 2 discloses an aqueous coating composition consisting essentially of a specific acrylic and/or polyester resin, a specific polycarbonate resin, a curing agent, and specific resin particles. However, the coating film formed using this coating composition may have a poor finished appearance, such as with a low degree of smoothness.

A method for forming a multilayer coating film by a 3-coat-2-bake (3C2B) method is widely used as a method for forming a coating film on automobile bodies. This method comprises the following steps after applying an electrodeposition coating to a substrate: application of an intermediate coating composition→curing by baking→application of an aqueous base coating composition→preheating (preliminary heating)→application of a clear coating composition→curing by baking. However, in recent years, for the purpose of energy savings and VOC reduction, attempts have been made to use an aqueous intermediate coating composition as an intermediate paint and omit the bake-curing step that may be performed after application of the intermediate coating composition, thereby using a 3-coat-1-bake (3C1B) method comprising the following steps after applying an electrodeposition coating to a substrate: application of an aqueous intermediate coating composition→preheating (preliminary heating)→application of an aqueous base coating composition→preheating (preliminary heating)→application of a clear coating composition→curing by baking (see, for example, Patent Literature 3).

In a 3-coat 1-bake method using an aqueous intermediate coating composition and an aqueous base coating composition as described above, an aqueous intermediate coating composition comprising a specific water-dispersible polyurethane composition has been proposed as an aqueous intermediate coating composition that has excellent removability in cleaning of coating guns, etc., and that can form a multilayer coating film with excellent chipping resistance and excellent coating film appearance; a method for forming a multilayer coating film using this aqueous intermediate coating composition has been also proposed (see, for example, Patent Literature 4).

However, the above method for forming a multilayer coating film using the aqueous intermediate coating composition may have a problem. That is, permeation of the solvent contained in a clear coating composition causes swelling of intermediate and base coating films, thus forming minute surface roughness, and thereby reducing the smoothness of the resulting multilayer coating film, which results in an unsatisfactory finished appearance and/or poor removability of the aqueous intermediate coating composition in bell cleaning.

CITATION LIST

Patent Literature

PTL 1: Japanese Unexamined Patent Publication No. H8-12925
PTL 2: Japanese Unexamined Patent Publication No. H8-209059
PTL 3: Japanese Unexamined Patent Publication No. 2004-358462
PTL 4: WO2005/075587

SUMMARY OF INVENTION

Technical Problem

An object of the present invention is to provide an aqueous coating composition with an excellent finished appearance and excellent removability in bell cleaning; and a method for forming a multilayer coating film with excellent smoothness by a 3-coat-1-bake method comprising successively applying an aqueous first colored coating composition, an aqueous second colored coating composition, and a clear coating composition to a substrate, and heat-curing the resulting three layers of the multilayer coating film all at once.

Solution to Problem

The present inventors conducted extensive research to achieve the above object, and as a result, found that a multilayer coating film having an excellent finished appearance can be formed by using an aqueous coating composition containing an acrylic resin (A); a curing agent (B); and a urethane resin emulsion (C) with a weight average molecular weight of 2,000 to 50,000, the urethane resin emulsion (C) being prepared using constituent components comprising a specific polyisocyanate component and a specific polyol component as starting materials. The inventors further found that in particular when this coating composition is used as an aqueous first colored coating composition in a 3-coat 1-bake method comprising sequentially applying an aqueous first colored coating composition, an aqueous second colored coating composition, and a clear coating composition to a substrate, a multilayer coating film with excellent smoothness can be formed. The present inventors further found that the aqueous coating composition having the above structural features has excellent removability in bell cleaning. The present invention has been accomplished based on these findings.

More specifically, the present invention provides an aqueous coating composition containing an acrylic resin (A); a curing agent (B); and a urethane resin emulsion (C) with a weight average molecular weight of 2,000 to 50,000. The urethane resin emulsion (C) is prepared using constituent components comprising a specific polyisocyanate component and a specific polyol component as starting materials. The polyisocyanate component contains an alicyclic diisocyanate. The polyol component contains a polycarbonate diol in an amount of 50 mass % or more, based on the total amount of the polyol component.

The present invention provides a method for forming a multilayer coating film. The method comprises sequentially performing the following steps (1) to (4) on a substrate:
step (1): forming a first colored coating film by applying an aqueous first colored coating composition (X);
step (2): forming a second colored coating film by applying an aqueous second colored coating composition (Y) to the first colored coating film formed in step (1);
step (3): forming a clear coating film by applying a clear coating composition (Z) to the second colored coating film formed in step (2); and
step (4): bake-drying the first colored coating film, the second colored coating film, and the clear coating film formed in steps (1) to (3) all at once.
In the method, the aqueous first colored coating composition (X) is the afore-mentioned aqueous coating composition.

Advantageous Effects of Invention

A main feature of the aqueous coating composition of the present invention is containing a urethane resin emulsion (C) prepared using constituent components comprising a polyisocyanate component and a polyol component, wherein the polyisocyanate component contains an alicyclic diisocyanate, and the polyol component contains a polycarbonate diol in an amount of 50 mass %, based on the total amount of the polyol component.

When the aqueous coating composition of the present invention containing a urethane resin emulsion is used as an aqueous first colored coating composition for forming a first colored coating film in the method for forming a multilayer coating film comprising a first colored coating film, a second colored coating film, and a clear coating film, swelling of the aqueous first colored coating film due to water and organic solvents is inhibited, thus preventing the formation of a mixed layer of the first colored coating film and the second colored coating film. Further, formation of minute surface roughness can also be prevented. The formation of minute surface roughness is a cause of a poor finished appearance and is caused by an organic solvent that permeates and swells the first and second colored coating films when a clear coating containing the organic solvent is applied.

Thus, according to the aqueous coating composition and the method for forming a multilayer coating film of the present invention, there can be provided a coating composition with excellent removability in bell cleaning and a multilayer coating film with excellent smoothness.

DESCRIPTION OF EMBODIMENTS

The aqueous coating composition and the method for forming a multilayer film according to the present invention are described below in more detail.

Aqueous Coating Composition

The aqueous coating composition of the present invention contains an acrylic resin (A); a curing agent (B); and a urethane resin emulsion (C) with a weight average molecular weight of 2,000 to 50,000. The emulsion (C) is prepared using a polyisocyanate component and a polyol component as starting materials. The polyisocyanate component contains an alicyclic diisocyanate. The polyol component contains a polycarbonate diol in an amount of 50 mass %, based on the total amount of the polyol component.

Acrylic Resins (A)

As the acrylic resin (A), any known water-soluble or water-dispersible acrylic resin that has been used in aqueous coating compositions can be used. In the present invention, the acrylic resin (A) typically contains a crosslinkable functional group that can react with the curing agent (B), such as a hydroxy, carboxy, or epoxy group. In particular, hydroxy-containing acrylic resins are preferably used.

The acrylic resin (A) can be produced by known methods or methods similar thereto.

For example, hydroxy-containing acrylic resins can be produced by copolymerizing a hydroxy-containing polymerizable unsaturated monomer and another polymerizable unsaturated monomer copolymerizable with the hydroxy-containing polymerizable unsaturated monomer, using a known method, such as a solution polymerization method in an organic solvent or an emulsion polymerization method in water.

The hydroxy-containing polymerizable unsaturated monomer is a compound having one or more hydroxy groups and one or more polymerizable unsaturated bonds per molecule. Examples thereof include monoesterified products of (meth)acrylic acid with a dihydric alcohol having 2 to 8 carbon atoms, such as 2-hydroxyethyl(meth)acrylate, 2-hydroxypropyl(meth)acrylate, 3-hydroxypropyl(meth)acrylate, and 4-hydroxybutyl(meth)acrylate; ε-caprolactone-modified products of the monoesterified products of (meth)acrylic acid with a dihydric alcohol having 2 to 8 carbon atoms; N-hydroxymethyl(meth)acrylamide; allyl alcohol; and (meth)acrylates having a hydroxy-terminated polyoxyethylene chain.

The term "(meth)acrylate" used in this specification means "acrylate or methacrylate". The term "(meth)acrylic acid" means "acrylic acid or methacrylic acid". The term "(meth)acryloyl" means "acryloyl or methacryloyl". The term "(meth)acrylamide" means "acrylamide or methacrylamide".

The other polymerizable unsaturated monomer copolymerizable with the hydroxy-containing polymerizable unsaturated monomer may be suitably selected according to the properties required of the hydroxy-containing acrylic resin. Specific examples of usable monomers are listed in (i) to (xix). However, it should be understood that these examples are non-limiting and other polymerizable unsaturated monomers, not listed below, can also be suitably used insofar as they are copolymerizable. Such monomers may be used singly or in a combination of two or more.

(i) Alkyl or cycloalkyl(meth)acrylates: for example, methyl(meth)acrylate, ethyl(meth)acrylate, n-propyl(meth)acrylate, iso-propyl(meth)acrylate, n-butyl(meth)acrylate, iso-butyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, isostearyl(meth)acrylate, cyclohexyl(meth)acrylate, methylcyclohexyl(meth)acrylate, tert-butylcyclohexyl(meth)acrylate, cyclododecyl(meth)acrylate, and tricyclodecanyl(meth)acrylate.

(ii) Polymerizable unsaturated monomers having an isobornyl group: for example, isobornyl(meth)acrylate.

(iii) Polymerizable unsaturated monomers having an adamantyl group: for example, adamantyl(meth)acrylate.

(iv) Polymerizable unsaturated monomer having a tricyclodecenyl group: for example, tricyclodecenyl(meth)acrylate.

(v) Aromatic ring-containing polymerizable unsaturated monomers: for example, benzyl(meth)acrylate, styrene, α-methyl styrene, and vinyltoluene.

(vi) Polymerizable unsaturated monomers having an alkoxysilyl group: for example, vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane.

(vii) Polymerizable unsaturated monomers having a fluorinated alkyl group: for example, perfluoroalkyl(meth)acrylates, such as perfluorobutylethyl(meth)acrylate and perfluorooctylethyl(meth)acrylate; and fluoroolefin.

(viii) Polymerizable unsaturated monomers having a photopolymerizable functional group, such as a maleimide group: those widely used in this technical field.

(ix) Vinyl compounds: for example, N-vinylpyrrolidone, ethylene, butadiene, chloroprene, vinyl propionate, and vinyl acetate.

(x) Phosphate group-containing polymerizable unsaturated monomers: for example, 2-acryloyloxyethyl acid phosphate, 2-methacryloyloxyethyl acid phosphate, 2-acryloyloxypropyl acid phosphate, and 2-methacryloyloxypropyl acid phosphate.

(xi) Carboxy-containing polymerizable unsaturated monomers: for example, (meth)acrylic acid, maleic acid, crotonic acid, and β-carboxyethyl acrylate.

(xii) Nitrogen-containing polymerizable unsaturated monomers: for example, (meth) acrylonitrile, (meth) acrylamide, N,N-dimethylaminoethyl(meth)acrylate, N,N-diethylaminoethyl(meth)acrylate, N,N-dimethylaminopropyl (meth)acrylamide, methylene bis(meth)acrylamide, ethylene bis(meth)acrylamide, 2-(methacryloyloxy)ethyl trimethylammonium chloride, and adducts of glycidyl(meth)acrylate with amines.

(xiii) Polymerizable unsaturated monomers having two or more polymerizable unsaturated groups per molecule: for example, allyl(meth)acrylate, ethylene glycol di(meth)acrylate, and 1,6-hexanediol di(meth)acrylate.

(xiv) Epoxy-containing polymerizable unsaturated monomers: for example, glycidyl(meth)acrylate, β-methylglycidyl (meth)acrylate, 3,4-epoxycyclohexylmethyl(meth)acrylate, 3,4-epoxycyclohexylethyl(meth)acrylate, 3,4-epoxycyclohexylpropyl(meth)acrylate, and allyl glycidyl ether.

(xv) (Meth)acrylates having an alkoxy-terminated polyoxyethylene chain: those widely used in this technical field.

(xvi) Sulfonic acid group-containing polymerizable unsaturated monomers: for example, 2-acrylamide-2-methylpropanesulfonic acid, 2-sulfoethyl(meth)acrylate, allylsulfonic acid, and 4-styrenesulfonic acid; and sodium salts and ammonium salts of such sulfonic acids.

(xvii) Polymerizable unsaturated monomers having a UV-absorbing functional group: for example, 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole.

(xviii) Photostable polymerizable unsaturated monomers: for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Carbonyl-containing polymerizable unsaturated monomers: for example, acrolein, diacetone acrylamide, diacetone methacrylamide, acetoacetoxy ethyl methacrylate, formylstyrol, and vinyl alkyl ketones having 4 to 7 carbon atoms (e.g., vinyl methyl ketone, vinyl ethyl ketone, and vinyl butyl ketone).

Further, examples of the hydroxy-containing acrylic resins may also include so-called urethane-modified polyester resins (excluding the later-described urethane resin emulsion (C)), in which polyisocyanate compounds are extended to higher molecular weight by urethanization reactions with some of the hydroxy groups in the hydroxy-containing acrylic resin.

The hydroxy-containing acrylic resin (A1) has a hydroxy value of 1 to 200 mg KOH/g, preferably 2 to 100 mg KOH/g, and more preferably 5 to 80 mg KOH/g, in view of storage stability, water resistance of the resulting coating film, etc.

Preferably, the hydroxy-containing acrylic resin (A1) has an acid value of 0 to 200 mg KOH/g, more preferably 0 to 100 mg KOH/g, and even more preferably 0 to 50 mg KOH/g, in view of water resistance of the resulting coating film, etc.

The weight average molecular weight of the hydroxy-containing acrylic resin (A1) is preferably 2,000 to 5,000,000, and more preferably 10,000 to 2,000,000, in view of appearance, water resistance of the resulting coating film, etc.

In the present specification, the number average molecular weight and the weight average molecular weight are converted values obtained by gel permeation chromatography using tetrahydrofuran as a solvent, and using polystyrene having a known molecular weight as a reference substance.

Water-dispersible acrylic resin particles synthesized by emulsion polymerization in water are particularly preferable as the acrylic resin.

The water-dispersible acrylic resin particles can be obtained, for example, by subjecting a polymerizable unsaturated monomer, as typified by a vinyl monomer, to emulsion polymerization using a radical polymerization initiator in the presence of a dispersion stabilizer, such as a surfactant.

Examples of the polymerizable unsaturated monomer subjected to the emulsion polymerization include carboxy-containing polymerizable unsaturated monomers (M-1); hydroxy-containing polymerizable unsaturated monomers (M-2); other polymerizable unsaturated monomers (M-3); and polyvinyl compounds (M-4) having two or more polymerizable unsaturated groups per molecule.

The carboxy-containing polymerizable unsaturated monomers (M-1) are compounds having one or more carboxy groups and one polymerizable unsaturated group per molecule. Examples thereof include acrylic acid, methacrylic acid, crotonic acid, maleic acid, and itaconic acid. Further, the monomers (M-1) as used herein encompass acid anhydrides of these compounds, and monocarboxylic acids formed by half-esterification of these acid anhydrides.

The carboxy-containing polymerizable unsaturated monomers are for introducing a carboxy group into the water-dispersible acrylic resin particles to impart water-dispersibility thereto.

Such carboxy-containing polymerizable unsaturated monomers (M-1) may be used singly or in a combination of two or more.

The hydroxy-containing polymerizable unsaturated monomers (M-2) are compounds having one hydroxy group and one polymerizable unsaturated group per molecule. The hydroxy group can act as a functional group that reacts with a cross-linking agent. More specifically, monoesterified products of acrylic acid or methacrylic acid with a dihydric alcohol having 2 to 10 carbons are preferably used as the monomers (M-2). Examples thereof include hydroxy-containing acrylate monomers, such as 2-hydroxyethyl acrylate, 2-hydroxypropyl acrylate, 3-hydroxypropyl acrylate, and 4-hydroxybutyl acrylate; hydroxy-containing methacrylate monomers, such as 2-hydroxyethyl methacrylate, 2-hydroxypropyl methacrylate, 3-hydroxypropyl methacrylate, and 4-hydroxybutyl methacrylate; N-methylolacrylamide; and N-methylolmethacrylamide.

Such hydroxy-containing polymerizable unsaturated monomers (M-2) may be used singly or in a combination of two or more.

The other polymerizable unsaturated monomers (M-3) are compounds that have one polymerizable unsaturated group per molecule and that are different from the monomers (M-1) and (M-2). Specific examples thereof are listed in (1) to (8) below.

(1) Alkyl(meth)acrylate monomers (such as monoesterified products of acrylic acid or methacrylic acid with a monohydric alcohol having 1 to 20 carbon atoms): for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate, stearyl acrylate, and stearyl methacrylate.

Among the above alkyl(meth)acrylate monomers, alkyl (meth)acrylate monomers having 4 to 14 carbon atoms in the alkyl group, preferably 4 to 8 carbon atoms, are preferable in view of the smoothness of the resulting multilayer coating film.

When an alkyl(meth)acrylate monomer having 4 to 14 carbon atoms in the alkyl group is used as a copolymerization component, the copolymerization amount is preferably 30 to 80 mass %, based on the total amount of the polymerizable unsaturated monomers.

(2) Aromatic vinyl monomers: for example, styrene, α-methylstyrene, and vinyltoluene.

(3) Glycidyl-containing vinyl monomers: compounds having one or more glycidyl groups and one polymerizable unsaturated bond per molecule; for example, glycidyl acrylate, and glycidyl methacrylate.

(4) Nitrogen-containing alkyl(meth)acrylates (having 1 to 20 carbon atoms in the alkyl group): for example, dimethylaminoethyl acrylate, and dimethylaminoethyl methacrylate.

(5) Polymerizable unsaturated group-containing amide compounds: compounds having one or more amide groups and one polymerizable unsaturated bond per molecule; for example, acrylamide, methacrylamide, dimethylacrylamide, N,N-dimethylpropylacrylamide, N-butoxymethylacrylamide, and diacetoneacrylamide.

(6) Polymerizable unsaturated group-containing nitrile compounds: for example, acrylonitrile and methacrylonitrile.

(7) Diene compounds: for example, butadiene and isoprene.

(8) Vinyl compounds: for example, vinyl acetate, vinyl propionate, and vinyl chloride.

Such other vinyl monomers (M-3) may be used singly or in a combination of two or more.

The polyvinyl compounds (M-4) are compounds having two or more polymerizable unsaturated groups per molecule. Examples thereof include ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylene bis(meth)acrylamide, and ethylene bis(meth)acrylamide. The polyvinyl compounds (M-4) do not encompass the above-mentioned diene compounds.

Such polyvinyl compounds (M-4) may be used singly or in a combination of two or more.

Although the proportions of the polymerizable unsaturated monomers in the water-dispersible acrylic resin particles are not particularly limited, preferable amounts thereof are as follows. The amount of carboxy-containing polymerizable unsaturated monomer (M-1) is preferably 0.1 to 25 mass %, more preferably 0.1 to 10 mass %, and particularly preferably 0.5 to 5 mass %, based on the total amount of the polymerizable unsaturated monomers, in view of water dispersibility and water resistance of the polymer particles, etc. Although the amount of hydroxy-containing polymerizable unsaturated monomer (M-2) varies depending on the type and amount of curing agent used, it may be preferably 0.1 to 40 mass %, more preferably 0.1 to 25 mass %, and further particularly preferably 1 to 10 mass %, based on the total amount of the polymerizable unsaturated monomers, in view of curability, water resistance of the coating film, etc. The other polymerizable unsaturated monomer(s) (M-3) can be suitably used in an amount such that the total amount of the polymerizable unsaturated monomers becomes 100 mass %, and the amount thereof is preferably 20 to 99.8 mass %, and more preferably 30 to 80 mass %, based on the total amount of the polymerizable unsaturated monomers.

The polyvinyl compound (M-4) is used, if necessary. The amount thereof is 0 to 15 mass %, preferably 0 to 10 mass %, and more preferably 0 to 5 mass %, based on the total amount of the polymerizable unsaturated monomers.

Examples of the above dispersion stabilizers include anionic emulsifiers, nonionic emulsifiers, and zwitterionic emulsifiers. Specific examples of anionic emulsifiers include fatty acids, alkyl sulfuric acid ester salts, alkylbenzene sulfonates, and alkyl phosphates. Examples of nonionic emulsifiers include polyoxyethylene alkylether, polyoxyethylene alkylarylether, polyoxyethylene compounds, sorbitan fatty acid esters, polyoxyethylene sorbitan fatty acid esters, polyoxyethylene alkylamines, and alkyl alkanolamides. Examples of zwitterionic emulsifiers include alkylbetaine.

Reactive emulsifiers are particularly suitably used as the dispersion stabilizer in view of copolymerizability in an emulsion polymerization reaction with a vinyl monomer for forming the water-dispersible acrylic resin particles; dispersion stability of the water-dispersible acrylic resin particles in the first colored coating composition; coating film performance, such as water resistance of a multilayer coating film obtained by the present invention; reduction in residual monomers for environmental protection; etc. The reactive emulsifiers are emulsifiers having radical reactivity with vinyl monomers. In other words, they are surfactants having a polymerizable unsaturated group per molecule.

Specific examples of reactive emulsifiers include Eleminol JS-1, Eleminol JS-2 (both manufactured by Sanyo Chemical Industries, Ltd.); S-120, S-180A, S-180, Latemul PD-104, Latemul PD-420, Latemul PD-4305, Latemul PD-450 (all manufactured by Kao Corporation); Aqualon HS-10, Aqualon KH-10 (both manufactured by Dai-Ichi Kogyo Seiyaku Co., Ltd.); Adekaria Soap SE-10N, Adekaria Soap SE-20N, Adekaria Soap SR-1025, Adekaria Soap ER-10, Adekaria Soap ER-20, Adekaria Soap ER-30, Adekaria Soap ER-40 (all manufactured by Asahi Denka Kogyo K.K.); and ANTOX MS-60 (manufactured by Nippon Nyukazai Co., Ltd.).

The dispersion stabilizers, such as the above emulsifiers, may be used singly or in a combination of two or more in the emulsion polymerization reaction.

The amount of dispersion stabilizer is preferably 0.1 to 10 mass %, particularly preferably 1 to 7.5 mass %, and further particularly preferably 1.5 to 6 mass %, relative to the water-dispersible acrylic resin particles that are produced.

Further, when a reactive emulsifier is used as the dispersion stabilizer, the amount of reactive emulsifier is preferably 0.1 to 10 mass %, particularly preferably 1.5 to 7.5 mass %, and further particularly preferably 2 to 6 mass %, relative to the water-dispersible acryl polymer particles that are produced.

Further, examples of radical polymerization initiators include peroxides, as typified by ammonium persulfate, potassium persulfate, and ammonium peroxide; so-called redox initiators, in which the above peroxides are combined with reducing agents, such as sodium hydrogen sulfite, sodium thiosulfate, rongalite, and ascorbic acid; and azo compounds, such as 2,2'-azobisisobutyronitrile, 4,4'-azobis (4-cyanopentanoic acid), and 2,2'-azobis[2-methyl-N-(4-hydroxyethyl)-propionamide]. Among these, azo compounds are preferable.

Preferably, the amount of the radical polymerization initiator is usually 0.1 to 5.0 mass %, more preferably 0.1 to 3.0 mass %, even more preferably 1 to 3.0 mass %, relative to the total weight of the solids content of the polymerizable unsaturated monomers for forming water-dispersible acrylic resin particles.

Preferably, the concentration of all the radical-polymerizable unsaturated monomers in the emulsion polymerization reaction is usually in the range of 0.1 to 60 mass %, more preferably 0.5 to 50 mass %, and even more preferably 1.0 to 50 mass %.

Although the reaction temperature during the emulsion polymerization varies depending on the type of radical polymerization initiator used, it can usually be set to 40° C. to 100° C., preferably 50° C. to 90° C., and more preferably 60° C. to 80° C.

The reaction time is usually 3 to 24 hours, preferably 5 to 20 hours, and more preferably 7 to 16 hours.

The water-dispersible acrylic resin particle may have an ordinary homogeneous structure, or a multilayer structure, such as a core/shell structure.

Specifically, the water-dispersible acrylic resin particle having a core/shell structure can be obtained by, for example, first forming a core by emulsion-polymerizing a polymerizable unsaturated monomer component that is entirely or substantially free of the carboxy-containing polymerizable unsaturated monomer (M-1) (for example, a monomer component containing a carboxy-containing polymerizable unsaturated monomer (M-1) in an amount of 0 to 1 mass %, relative to the total amount of monomers forming the core component), and then forming a shell by adding a polymerizable unsaturated monomer component containing a large amount of a carboxy-containing polymerizable unsaturated monomer (M-1) to perform emulsion polymerization.

The core can be bonded to the shell, for example, by copolymerizing a polymerizable unsaturated bond of allyl acrylate, allyl methacrylate, or the like, which remains on the surface of the core, with a polymerizable unsaturated monomer component containing the carboxy-containing polymerizable unsaturated monomer (M-1).

The water-dispersible acrylic resin particle may have a hydroxy value of 0 to 150 mg KOH/g, preferably 5 to 100 mg KOH/g, and more preferably 10 to 50 mg KOH/g, in view of water resistance and curability of the resulting coating film, etc.

Further, the water-dispersible acrylic resin particle may have an acid value of 0 to 100 mg KOH/g, preferably 0 to 50 mg KOH/g, and more preferably 0 to 35 mg KOH/g, in view of storage stability, water resistance of the resulting coating film, etc.

The water-dispersible acrylic resin particle may have an average particle size of 10 to 500 nm, preferably 20 to 300 nm, and more preferably 40 to 200 nm, in view of dispersion stability of the particles, and smoothness of the resulting coating film.

In this specification, the average particle size of the water-dispersible acrylic resin particles refers to a value obtained by measurement at 20° C. using a submicron particle size distribution analyzer after dilution with deionized water according to a usual method. For example, "COULTER N4" (trade name of Beckman Coulter, Inc.) may be used as the submicron particle size distribution analyzer.

The water-dispersible acrylic resin particle is preferably neutralized with a basic compound. As a neutralizing agent for the water-dispersible acrylic resin particle, ammonia or water-soluble amino compounds may be used. Examples of suitable neutralizing agents include monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, dimethylethanolamine, 2-amino-2-methyl propanol, diethanolamine, and morpholine.

Curing Agent (B)

As the curing agent (B) for the aqueous coating composition of the present invention, for example, melamine resins (b-1), polyisocyanate compounds (b-2), blocked polyisocyanate compounds (b-3), and carbodiimide group-containing compounds (b-4) can be used.

Among these, the melamine resins (b-1) can be suitably used.

The curing agent (B) is suitably used in an amount of 1 to 50 mass %, preferably 3 to 30 mass %, and more preferably 5 to 20 mass %, per 100 parts by mass of the resin solids content in the aqueous coating composition.

When a melamine resin is used as the curing agent (B), it is usually preferable that the acrylic resin (A) contains a hydroxy group. It is particularly preferable that the acrylic resin (A) has a hydroxy value of 1 to 200 mg KOH/g, preferably 3 to 100 mg KOH/g, and more preferably 5 to 80 mg KOH/g.

Examples of the melamine resin (b-1) include dimethylolmelamine, trimethylolmelamine, tetramethylolmelamine, pentamethylolmelamine, hexamethylolmelamine and like methylolmelamines; alkyl-etherified products of methylolmelamines with alcohols; and etherified products of methylolmelamine condensates with alcohols. Examples of alcohols used herein include methyl alcohol, ethyl alcohol, propyl alcohol, isopropyl alcohol, butyl alcohol, isobutyl alcohol, and 2-ethylhexyl alcohol.

Commercial products are available as melamine resins. Examples of trade names of such commercial products include "Cymel 303", "Cymel 323", "Cymel 325", "Cymel 327", "Cymel 350", "Cymel 370", "Cymel 380", "Cymel 385", "Cymel 212", "Cymel 253", "Cymel 254" (all manufactured by Cytec Industries Inc.); "Resimin 735", "Resimin 740", "Resimin 741", "Resimin 745", "Resimin 746", "Resimin 747" (all manufactured by Monsanto Co., Ltd.); "Sumimal M55", "Sumimal M30W", "Sumimal M50W" (all manufactured by Sumitomo Chemical Co., Ltd.); "U-VAN 20SE", and "U-VAN 28SE" (both manufactured by Mitsui Chemicals, Inc.).

Examples of usable melamine resins include those obtained by etherifying some or all of the methylol groups in a partially or fully methylolated melamine resin with methyl alcohol and/or buthyl alcohol, such as methyl-etherified melamine resins, butyl-etherified melamine resins, and methyl-butyl-etherified melamine resins.

Among these, methyl-etherified melamine resins can be preferably used, in view of anti-solvent swelling property; and imino group-containing methyl-etherified melamine resins can be preferably used, in view of chipping resistance.

Further, when a melamine resin is used as the curing agent, examples of usable curing catalysts include sulfonic acids such as p-toluenesulfonate, dodecylbenzenesulfonate, and dinonylnaphthalene sulfonate; salts obtained by neutralizing such sulfonic acids with amines; and salts obtained by neutralizing phosphoric ester compounds with amines.

When a polyisocyanate compound (b-2) is used as the curing agent (B), it is usually preferable that the acrylic resin (A) contains a hydroxy group. It is particularly preferable that the acrylic resin (A) has a hydroxy value of 100 to 200 mg KOH/g, preferably 130 to 180 mg KOH/g, and more preferably 140 to 170 mg KOH/g. Further, the equivalent ratio of isocyanate groups in the isocyanate group-containing compound (b-2) to hydroxy groups in the acrylic resin (A) (NCO:OH) is preferably in the range of 0.5:1 to 2.0:1, and more preferably 0.8:1 to 1.5:1.

The polyisocyanate compound (b-2) is a compound having at least two isocyanate groups per molecule. Examples thereof include aliphatic polyisocyanates, alicyclic polyisocyanates, aliphatic-aromatic polyisocyanates, aromatic polyisocyanates, and derivatives of these polyisocyanates.

Examples of the aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethylcaproate; and aliphatic triisocyanates, such as lysine ester triisocyanates, 1,4,8-triisocyanato octane, 1,6,11-triisocyanato undecane, 1,8-diisocyanato-4-isocyanato methyloctane, 1,3,6-triisocyanato hexane, and 2,5,7-trimethyl-1,8-diisocyanato-5-isocyanato methyloctane.

Examples of the alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylenediisocyanate) or a mixture thereof, and norbornane diisocyanate; alicyclic triisocyanates, such as 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1]heptane, 3-(3-isocyanatopropyl)-2,5-di(isocyanatomethyl)-bicyclo[2.2.1]heptane, 5-(2-isocyanatoethyl)-2-isocyanatomethyl-3-(3-isocyanatopropyl)-bicyclo[2.2.1]heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, and 6-(2-isocyanatoethyl)-2-isocyanatemethyl-2-(3-isocyanatopropyl)-bicyclo[2.2.1]heptane.

Examples of the aliphatic-aromatic polyisocyanates include aliphatic-aromatic diisocyanates, such as 1,3- or 1,4-xylylene diisocyanate or a mixture thereof, ω,ω'-diisocyanato 1,4-diethylbenzene, and 1,3- or 1,4-bis(1-isocyanato 1-methylethyl)benzene (common name: tetramethylxylylene diisocyanate) or a mixture thereof; and aliphatic-aromatic triisocyanates, such as 1,3,5-triisocyanatomethylbenzene.

Examples of the aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, and 4,4'-diphenylether diisocyanate; aromatic triisocyanates, such as triphenylmethane-4,4',4"-triisocyanate, 1,3,5-triisocyanato benzene, and 2,4,6-triisocyanato toluene; and aromatic tetraisocyanates, such as 4,4'-diphenylmethane-2,2',5,5'-tetraisocyanate.

Examples of the polyisocyanate derivatives include dimers, trimers, biurets, allophonates, urethodiones, urethoimines, isocyanurates, oxadiazinetriones, polymethylene polyphenyl polyisocyanates (crude MDI, polymeric MDI), and crude TDI of the polyisocyanate compounds described above.

The polyisocyanates and derivatives thereof may be used singly or in a combination of two or more. Among these, aliphatic diisocyanates, alicyclic diisocyanates, and derivatives thereof may be suitably used singly or in a combination of two or more.

As the polyisocyanate compound (b-2) of the present invention, hydrophilic polyisocyanate compounds (b-2') obtained by modifying a polyisocyanate compound to have a hydrophilic property are particularly preferable, in view of the smoothness of the resulting coating film.

Examples of hydrophilic polyisocyanate compounds (b-2') include anionic hydrophilic polyisocyanate compounds (b-2'-1) and nonionic hydrophilic polyisocyanate compounds (b-2'-2). The anionic hydrophilic polyisocyanate compounds (b-2'-1) are obtained by reacting the isocyanate group of a polyisocyanate compound with the active hydrogen group of an active-hydrogen-group-containing compound having an anionic group. The nonionic hydrophilic polyisocyanate compounds (b-2'-2) are obtained by reacting a polyisocyanate compound with a hydrophilic polyether alcohol, such as monoalcohol of polyoxyethylene.

The active-hydrogen-group-containing compound having an anionic group contains an anionic group, such as a carboxy group, a sulfonic acid group, a phosphate group, or a betaine-structure-containing group, such as sulfobetaine, and further contains an active hydrogen group that is reactive to an isocyanate group, such as a hydroxy or amino group. The reaction of a polyisocyanate compound with such an active-hydrogen-group-containing compound renders the polyisocyanate compound hydrophilic.

Examples of the active-hydrogen-group-containing compounds having an anionic group include, but are not limited to, compounds having one anionic group and two or more active hydrogen groups. Specific examples of active-hydrogen-group-containing compounds having a carboxy group include dihydroxy carboxylic acids, such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid, and 2,2-dimethylolvaleric acid; diaminocarboxylic acids, such as 1-carboxy-1,5-pentylenediamine, dihydroxybenzoic acid, 3,5-diaminobenzoic acid, lysine, and arginine; and half-ester compounds of polyoxypropylene triol with maleic anhydride, phthalic anhydride, or the like.

Examples of the active-hydrogen-group-containing compounds having a sulfonic acid group include N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid, and 3-(cyclohexylamino)-propanesulfonic acid.

Examples of the active-hydrogen-group-containing compounds having a phosphate group include 2,3-dihydroxypropylphenylphosphate.

Examples of the active-hydrogen-group-containing compounds having a betaine-structure-containing group include sulfobetaine-group-containing compounds obtained by, for example, reacting a tertiary amine, such as N-methyl diethanolamine, with 1,3-propane sultone.

Further, these active-hydrogen-group-containing compounds having an anionic group may be modified into alkylene oxide modified products by adding thereto an alkylene oxide, such as ethylene oxide or propylene oxide.

Such active-hydrogen-group-containing compounds having an anionic group may be used singly or in a combination of two or more.

Nonionic emulsifiers and anionic emulsifiers may be used as the emulsifiers for imparting water-dispersibility to the polyisocyanate compound. Polyethylene oxides can be suitably used as nonionic groups. Sulfate or phosphate salts can be suitably used as anionic groups. These may be used in combination.

The polyisocyanate compound to be used may be selected from those mentioned above. Examples of particularly preferable polyisocyanate compounds include hexamethylene diisocyanate (HMDI), hexamethylene diisocyanate derivatives, isophorone diisocyanate (IPDI), and derivatives of isophorone diisocyanate.

The blocked polyisocyanate compound (b-3) to be used may be selected from the above-mentioned aliphatic polyisocyanates, alicyclic polyisocyanates, aromatic aliphatic polyisocyanates, aromatic polyisocyanates, and blocked derivatives thereof.

Examples of the derivatives include isocyanurates, biurets, and adducts (e.g., TMP (trimethylolpropane) adducts).

A blocking agent is used for blocking free isocyanate groups. When a blocked polyisocyanate compound is heated at, for example, a temperature of 100° C. or higher, and preferably 130° C. or higher, isocyanate groups are regenerated and can readily react with hydroxy groups. Examples of blocking agents that can be used include phenol, cresol, xylenol, nitrophenol, ethylphenol, hydroxydiphenyl, butylphenol, isopropylphenol, nonylphenol, octylphenol, methyl hydroxybenzoate, and like phenol compounds; ε-caprolactam, δ-valerolactam, γ-butyrolactam, β-propiolactam, and like lactam compounds; methanol, ethanol, propyl alcohol, butyl alcohol, amyl alcohol, lauryl alcohol, and like aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether compounds; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol compounds; formamide oxime, acetamide oxime, acetoxime, methyl ethyl ketoxime, diacetyl monoxime, benzophenone oxime, cyclohexane oxime, and like oxime compounds; dimethyl malonate, diethyl malonate, ethyl acetoacetate, methyl acetoacetate, acetylacetone, and like active methylene compounds; butyl mercaptan, tert-butyl mercaptan, hexyl mercaptan, tert-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetamide, stearamide, benzamide, and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amines; imidazole, 2-ethylimidazole, and like imidazole compounds; 3,5-dimethylpyrazole and like pyrazole compounds; urea, thiourea, ethylene urea, ethylenethiourea, diphenylurea, and like urea compounds; phenyl N-phenylcarbamate and like carbamate compounds; ethyleneimine, propyleneimine and like imine compounds; and sodium bisulfite, potassium bisulfite, and like sulfite compounds.

A hydroxy carboxylic acid having one or more hydroxy groups and one or more carboxy groups per molecule may be used as a part of the blocking agent. Examples of the hydroxy carboxylic acid include hydroxy pivalic acid and dimethylol propionic acid. The mono-blocked isocyanate compound blocked by a hydroxy carboxylic acid has a carboxy group derived from the hydroxy carboxylic acid, and is preferable in view of good water dispersibility based on the hydrophilicity of the carboxy group.

Further, a polyethylene glycol having a hydroxy group at one end and a methoxy group at the other end may be used as a part of the blocking agent to introduce a nonionic hydrophilic group and thereby impart water dispersibility. Examples of commercial products that can be used include "Desmodule PL3470", "Desmodule PL3475", and "Desmodule VPLS2253" (trade names; all manufactured by Sumika Bayer Urethane Co., Ltd.).

When the blocked polyisocyanate compound (b-3) is used as a curing agent, an organic tin compound may be used as a curing catalyst.

The carbodiimide group-containing compound (b-4) can be obtained, for example, by subjecting isocyanate groups in a polyisocyanate compound to a carbon dioxide removal reaction. Examples of commercial products that can be used as the carbodiimide group-containing compound include "Carbodilite V-02", "Carbodilite V-02-L2", "Carbodilite V-04", "Carbodilite E-01", and "Carbodilite E-02" (trade names; all manufactured by Nisshinbo Industries, Inc.).

When the carbodiimide group-containing compound (b-4) is used as the curing agent (B), it is usually preferable that the acrylic resin (A) contains a carboxy group. It is particularly preferable that the acrylic resin (A) has an acid value based on the carboxy group of 5 to 80 mg KOH/g, more preferably 10 to 70 mg KOH/g, and even more preferably 30 to 70 mg KOH/g.

Urethane Resin Emulsion (C)

The urethane resin emulsion (C) contained in the aqueous coating composition of the present invention has the following features: the emulsion (C) is prepared by reacting a polyisocyanate component (c1) and a polyol component (c2); the polyisocyanate component (c1) contains an alicyclic diisocyanate; and the polyol component (c2) contains a polycarbonate diol in an amount of 50 mass %, based on the total amount of the polyol component (c2).

Examples of the polyisocyanate component (c1) include an alicyclic diisocyanate as the essential component and other polyisocyanates.

Examples of the alicyclic diisocyanate include isophorone diisocyanate, dicyclohexylmethane-4,4'-diisocyanate, trans-1,4-cyclohexyl diisocyanate, and norbornane diisocyanate. Among these, isophorone diisocyanate and dicyclohexylmethane-4,4'-diisocyanate are particularly preferable as the alicyclic diisocyanates, in view of improved anti-organic solvent swelling property of the resulting coating film.

The content (mass %) of the aliphatic diisocyanate in the polyisocyanate component (c1) is preferably 50 to 100%, and more preferably 70 to 100%, in view of chipping resistance.

Examples of other polyisocyanates are diisocyanates other than alicyclic diisocyanates and polyisocyanates having three or more isocyanate groups per molecule.

Examples of diisocyanates other than alicyclic diisocyanate include tolylene diisocyanate, diphenylmethane-4,4'-diisocyanate, p-phenylene diisocyanate, xylylene diisocyanate, 1,5-naphtylene diisocyanate, 3,3'-dimethyldiphenyl-4,4'-diisocyanate, dianisidine diisocyanate, tetramethylxylylene diisocyanate, and like aromatic diisocyanates; and 1,6-hexamethylene diisocyanate, 2,2,4 and/or (2,4,4)-trimethylhexamethylene diisocyanate, lysine diisocyanate, and like aliphatic diisocyanates.

The above diisocyanates may be used in the form of isocyanates blocked with various blocking agents.

Examples of polyisocyanates having three or more isocyanate groups per molecule include isocyanurate trimers and biuret trimers of the above-mentioned diisocyanate, trimethylolpropane adducts; and triphenylmethane triisocyanate, 1-methylbenzole-2,4,6-triisocyanate, dimethyl triphenylmethane tetraisocyanate, and like tri- or poly-functional isocyanates. These isocyanate compounds may be used in the form of modified products, such as carbodiimide-modified products, isocyanurate-modified products, and biuret-modified products, or in the form of blocked isocyanates, i.e., isocyanates blocked with various blocking agents.

Examples of the polyol component (c2) used as a starting material for the urethane resin emulsion (C) include polycarbonate polyols, including polycarbonate diols used as an essential component, ester bond-containing polyols, polycaprolactone polyols, low-molecular-weight polyols, polyether polyols, polybutadiene polyols, and silicone polyols.

The polycarbonate polyols are compounds obtained by a polycondensation reaction of a known polyol with a carbonylating agent according to a usual method.

Examples of polyols that can be used as starting materials for polycarbonate polyols include diols, and trihydric or higher polyhydric alcohols.

Among the polyols that can be used as starting materials for polycarbonate polyols, examples of diols include 1,3-propanediol, 1,4-butanediol, 1,5-pentanediol, 1,6-hexanediol, 1,7-heptanediol, 1,8-octanediol, 1,9-nonanediol, 1,10-decanediol, and like straight-chain aliphatic diols; 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, and like branched-chain aliphatic diols; 1,3-cyclohexane diol, 1,4-cyclohexane diol, 1,4-cyclohexane dimethanol, and like alicyclic diols; p-xylenediol, p-tetrachloroxylenediol, and like aromatic diols; and diethylene glycol, dipropylene glycol, and like ether diols. Such diols may be used singly or in a combination of two or more.

Among the polyols that can be used as starting materials for polycarbonate polyols, examples of trihydric or higher polyhydric alcohols usable as starting materials for polycarbonate polyols include glycerin, trimethylolethane, trimethylolpropane, trimethylolpropane dimer, and pentaerythritol. Such trihydric or higher polyhydric alcohols can be used singly or in a combination of two or more.

Known carbonylating agents may be used as the carbonylating agent used as a starting material for polycarbonate polyols. Specific examples thereof include alkylene carbonates, dialkyl carbonates, diaryl carbonates, and phosgene. These compounds may be used singly or in a combination of two or more. Among these, preferable are ethylene carbonate, propylene carbonate, dimethyl carbonate, diethyl carbonate, dibutyl carbonate, diphenyl carbonate, etc.

The polycarbonate diol used as an essential starting material in the present invention can be synthesized by using a diol as the only polyol that is reacted with a carbonylating agent, without using trihydric or higher polyhydric alcohols.

The diol component of the polycarbonate diol may be a diol typically having 6 or more carbon atoms, preferably 6 to 20 carbon atoms, and more preferably 6 to 15 carbon atoms, and further more preferably 6 to 12 carbon atoms.

Examples of the diol having 6 or more carbon atoms include cycloalkylene group-containing alicyclic diol having 6 or more carbon atoms, and alkylene group-containing cycloalkylene groups having 6 or more carbon atoms.

Examples of cycloalkylene group-containing alicyclic diols having 6 or more carbon atoms include alicyclic diols having 6 or more carbon atoms, and preferably 6 to 12 carbon atoms, such as 1,3-cyclohexanediol, 1,4-cyclohexanediol, and 1,4-cyclohexane dimethanol.

Among these, 1,4-cyclohexane dimethanol is preferable in view of chipping resistance.

Examples of alkylene group-containing aliphatic diols having 6 or more carbon atoms include straight or branched-chain aliphatic diols having 6 or more carbon atoms, and preferably 6 to 10 carbon atoms, such as 1,6-hexanediol, 1,7-heptanediol, 1,8-octanediol, 1,9-nonanediol, 1,10-decanediol, and like straight-chain aliphatic diols; and 3-methyl-1,5-pentanediol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, and like branched-chain aliphatic diols.

Either the above straight-chain aliphatic diols or branched-chain aliphatic diols, or both may be used.

Among these, straight-chain aliphatic diols are preferable in view of chipping resistance. 1,6-hexanediol is particularly preferable.

The diol component of the polycarbonate diol preferably contains a $C_6$ or greater diol in an amount of 90 mass % or more, and particularly preferably 95 mass % or more, relative to the total amount of the diol component.

In view of the surface smoothness of the resulting multilayer coating film, the following polycarbonate diols are particularly preferable: polycarbonate diols obtained by a reaction of a diol component with a carbonylating agent, wherein the diol component contains a $C_6$ or greater diol in an amount of 90 mass % or more, based on the total amount of the diol component; and the $C_6$ or greater diol contains a cycloalkylene group-containing alicyclic diol having 6 or more carbon atoms.

The cycloalkylene group-containing alicyclic diols having 6 or more carbon atoms is preferably used in an amount of 50 mass % or more, more preferably 65 to 100 mass %, and particularly preferably 75 to 100 mass %.

In another preferable embodiment, examples of polycarbonate diols that can be used as a starting material for the urethane resin emulsion (C) include polycarbonate diols produced using a diol component containing a cycloalkylene group-containing diol having 6 or more carbon atoms as mentioned above, i.e., polycarbonate diols obtained by reacting a diol component containing a cycloalkylene group-containing $C_6$ or greater alicyclic diol, with a carbonylating agent.

In this embodiment, examples of polycarbonate diols that can be preferably used as a starting material for the urethane resin emulsion (C) include polycarbonate diols produced using a diol component containing a cycloalkylene group-containing alicyclic diol having 6 or more carbon atoms and an alkylene group-containing aliphatic diol having 6 or more carbon atoms, wherein the total amount of the alicyclic diol and the aliphatic diol in the diol component is 50 mass % or more, based on the total amount of the diol component, that is, polycarbonate diols obtained by reacting a diol component containing an alicyclic diol and an aliphatic diol in an amount of 50 mass % or more, with a carbonylating agent.

In this embodiment, it is further preferable that 1,4-cyclohexane dimethanol is used as a cycloalkylene group-containing alicyclic diol having 6 or more carbon atoms, and 1,6-hexanediol is used as an alkylene group-containing aliphatic diol having 6 or more carbon atoms.

In this embodiment, the mass ratio of the cycloalkylene group-containing alicyclic diol having 6 or more carbon atoms to the alkylene group-containing aliphatic diol having 6 or more carbon atoms is preferably in the range of 20:80 to 80:20.

In another preferable embodiment, examples of polycarbonate diols that can be used as a starting material for the urethane resin emulsion (C) include polycarbonate diol components produced using a diol component containing an alkylene group-containing aliphatic diol having 6 or more carbon atoms and a cycloalkylene group-containing alicyclic diol having 6 or more carbon atoms, wherein the total amount of the aliphatic diol and the alicyclic diol in the diol component is 50 mass % or more, based on the total amount of the diol component.

In this embodiment, preferably, 1,6-hexanediol can be used as the alkylene group-containing aliphatic diol having 6 or more carbon atoms, and 1,4-cyclohexane dimethanol can be used as the cycloalkylene group-containing alicyclic diol having 6 or more carbon atoms.

In this embodiment, the mass ratio of the alkylene group-containing aliphatic diol having 6 or more carbon atoms to the cycloalkylene group-containing alicyclic diol having 6 or more carbon atoms is preferably in the range of 20:80 to 80:20.

Among the polyol components (c2), examples of ester bond-containing polyols include polyester polyols and polyester polycarbonate polyols.

Examples of the polyester polyols include those obtained by a direct esterification reaction and/or an ester exchange reaction of a polyhydric alcohol with a polycarboxylic acid or an ester-forming compound thereof, such as an ester, anhydride, or halide thereof, wherein the polycarboxylic acid or ester-forming compound is used in an amount less than the stoichiometric amount of the polyhydric alcohol.

Examples of polyhydric alcohols that can be used as starting materials for polyester polyols include ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol, triethylene glycol, and like aliphatic diol compounds; cyclohexane dimethanol, cyclohexane diol, and like alicyclic diol compounds; and trimethylolethane, trimethylolpropane, hexitol compounds, pentitol compounds, glycerin, pentaerythritol, tetramethylolpropane, and like trihydric or higher polyhydric alcohol compounds.

Examples of polycarboxylic acids or ester-forming compounds thereof that can be used as starting materials for polyester polyols include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, dimer acid, and like aliphatic dicarboxylic acid compounds; phthalic acid, terephthalic acid, isophthalic acid, naphthalene dicarboxylic acid, and like aromatic dicarboxylic acid compounds; 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 1,4-dicarboxymethylcyclohexane, nadic acid, methylnadic acid, and like alicyclic dicarboxylic acid compounds; tricarboxylic acid compounds (e.g., trimellitic acid, trimesic acid, and trimer of castor oil fatty acid), and like polycarboxylic acids; acid anhydrides of these polycarboxylic acids; halides, such as chlorides and bromides of the polycarboxylic acids; lower esters of the polycarboxylic acids, such as methyl esters, ethyl esters, propyl esters, isopropyl esters, butyl esters, isobutyl esters, and amyl esters; and γ-caprolactone, δ-caprolactone, ε-caprolactone, dimethyl-ε-caprolactone, δ-valerolactone, γ-valerolactone, γ-butyrolactone, and like lactone compounds.

Among the polyol components (c2), examples of polycaprolactone polyols include ring-opened polymers of caprolactones, such as polycaprolactone diols.

Among the polyol components (c2), examples of low-molecular-weight polyols include polyhydric alcohols exemplified by polyester polyols.

Among the polyol components (c2), examples of polyether polyols include ethylene oxide and/or propylene oxide adducts of the above-mentioned low-molecular-weight polyols and polytetramethylene glycols.

Among the polyol components (c2), examples of polybutadiene polyols are those widely known in this technical field.

Examples of silicone polyols include hydroxy-terminated silicone oil compounds having a siloxane bond in the molecule.

As the polyol component (c2), a carboxy-containing diol can be used. The carboxy-containing diol is used for introducing a hydrophilic group to the polyurethane molecules. The hydrophilic group is a carboxy group. Specific examples thereof include dimethylol propionic acid, dimethylol butanoic acid, dimethylol butyric acid, and dimethylol valeric acid.

In the present invention, the amount of the polycarbonate diol component in the urethane resin emulsion (C) is preferably 50 mass % or more, particularly preferably 75 to 100 mass %, and further particularly preferably 90 to 100 mass %, based on the total amount of the polyol component (c2), in view of the surface smoothness of the coated surface.

The urethane resin emulsion (C) to be incorporated in the composition of the invention may be produced by using an amine component, in addition to the polyisocyanate component (c1) and the polyol component (c2), if necessary. Examples of the amine component include monoamine compounds and diamine compounds.

The monoamine compounds are not particularly limited, and known monoamine compounds can be used singly or in a combination or two or more. Examples of the monoamine compounds include ethylamine, propylamine, 2-propylamine, butylamine, 2-butylamine, tertiary butylamine, isobutylamine, and like alkylamines; aniline, methylaniline, phenylnaphthylamine, naphtylamine, and like aromatic amines; cyclohexylamine, methylcyclohexylamine, and like alicyclic amines; 2-methoxy ethylamine, 3-methoxy propylamine, 2-(2-methoxyethoxy)ethylamine, and like ether amines; ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, N-ethylethanolamine, and like alkanolamines. Among these, alkanolamines are preferable because they impart good water dispersion stability to polyurethane molecules. 2-aminoethanol and diethanolamine are preferable in view of supply stability.

The diamine compounds are not particularly limited, and known diamine compounds can be used singly or in a combination or two or more. Examples of the diamine compounds include low-molecular-weight diamine compounds obtained by substitution of an alcoholic hydroxy group in the above-exemplified low-molecular-weight diols with an amino group, such as ethylenediamine and propylenediamine; polyoxypropylenediamine, polyoxyethylenediamine and like polyetherdiamine compounds; menthanediamine, isophoronediamine, norbornenediamine, bis(4-amino-3-methyldicyclohexyl)methane, diaminodicyclohexylmethane, bis(aminomethyl)cyclohexane, 3,9-bis(3-aminopropyl)2,4,8,10-25 tetraoxaspiro(5,5)undecane, and like alicyclic diamine compounds; m-xylenediamine, α-(m/paminophenyl)lethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α-bis(4-aminophenyl)-p-disopropylbenzene, and like aromatic diamine compounds; hydrazines; and dicarboxylic acid dihydrazide compounds, which are compounds formed between dicarboxylic acids exemplified by the polycarboxylic acids used for the polyester polyols, and hydrazines. Among the diamine compounds, low-molecular-weight diamines are preferable in view of handleability. Ethylenediamines are particularly preferable.

Further, a carboxy-neutralizing component may be used, if necessary.

The carboxy-neutralizing component is a basic compound that reacts with a carboxy group in the carboxy-containing diol and that forms a hydrophilic salt. Examples thereof include trimethylamine, triethylamine, tributylamine, and like trialkylamine compounds; N,N-dimethylethanolamine, N,N-dimethylpropanolamine, N,N-dipropylethanolamine, 1-dimethylamino-2-methyl-2-propanol, and like N,N-dialkyl alkanolamine compounds; N-alkyl-N,N-dialkanolamine compounds; trialkanolamines (such as triethanolamine), and like tertiary amine compounds; ammonia; trimethyl ammonium hydroxide; sodium hydroxide; potassium hydroxide; and lithium hydroxide. Among these, tertiary amine compounds are preferable because the dispersion stability of the resulting urethane resin emulsion (C) is good.

In addition to the components described above, the urethane resin emulsion (C) may further contain an internal branching agent for imparting a branched structure to the polyurethane molecules and/or an internal cross-linking agent for imparting a cross-linking structure to the polyurethane molecules. Trihydric or higher polyhydric polyols can be preferably used as such internal branching agents and internal cross-linking agents. Examples thereof include trimethylolpropane.

The method for producing the urethane resin emulsion (C) is not particularly limited, and can be selected from known methods. A preferable production method comprises synthesizing a prepolymer or polymer in a solvent that is inert to reaction and that has high hydrophilicity, and feeding the prepolymer or polymer to water to disperse the same therein. Specific examples of such methods include (A) a method comprising synthesizing a prepolymer from the polyisocyanate component and the polyol component in the above solvent, and reacting the prepolymer in water with an amine component, which is used if necessary; and (B) a method comprising synthesizing a polymer from the polyisocyanate component, the polyol component, and an amine component, which is used if necessary, and feeding the polymer to water to disperse the same therein. The neutralizing component, which is used if necessary, may be added in advance to water to which the prepolymer or polymer is fed, or may be added to water after the prepolymer or polymer is fed.

Examples of solvents that are inert to reaction and that have high hydrophilicity, which are used in the preferable production method, include acetone, methyl ethyl ketone, dioxane, tetrahydrofuran, and N-methyl-2-pyrrolidone. Such solvents are typically used in an amount of 3 to 100 mass %, relative to the total amount of the starting materials used for producing a prepolymer.

In the above production methods, the composition ratio is not particularly limited. The composition ratio can be expressed in the molar ratio of isocyanate-reactive groups in the polyol component and the amine component to isocyanate groups in the polyisocyanate component at the time of the reaction. The molar ratio of the isocyanate-reactive groups to the isocyanate groups is preferably in the range of 0.5:1 to 2.0:1. This is because if the amount of unreacted isocyanate groups in the dispersed polyurethane molecules is insufficient, the adhesion and/or strength of the coating film may be reduced when the product is used as a coating composition; whereas if unreacted isocyanate groups are present in excess, the dispersion stability and/or properties of the coating composition may be affected by the isocyanate groups. The molar ratio of isocyanate-reactive groups in the polyol component to isocyanate groups in the polyisocyanate component is preferably in the range of 0.3:1 to 1.0:1, and more preferably 0.5:1 to 0.9:1. Further, the molar ratio of isocyanate-reactive groups in the amine component, which is used if necessary, to isocyanate groups in the polyisocyanate component is preferably in the range of 0.1:1 to 1.0:1, and more preferably 0.2:1 to 0.5:1.

Furthermore, the rate of neutralization by the carboxy-neutralizing component, which is used if necessary, is set to a range that imparts sufficient dispersion stability to the resulting urethane resin emulsion (C). The amount of carboxy-neutralizing component is preferably 0.5 to 2.0 equivalents, and more preferably 0.7 to 1.5 equivalents, per mole of carboxy groups in the carboxy-containing diol.

In order to stabilize the dispersibility of the urethane resin emulsion (C), emulsifiers, such as surfactants may be used singly or in a combination of two or more. Although the particle size is not particularly limited, it is preferably 1 μm or less, and more preferably 500 nm or less, in view of maintaining a good dispersion state.

Examples of usable emulsifiers include known surfactants used in urethane resin emulsions, such as anionic surfactants, nonionic surfactants, cationic surfactants, amphoteric surfactants, polymeric surfactants, and reactive surfactants. Among these surfactants, anionic surfactants, nonionic surfactants, and cationic surfactants are preferable because they are low-cost and can provide good emulsification.

Examples of anionic surfactants include sodium dodecyl sulfate, potassium dodecyl sulfate, ammonium dodecyl sulfate and like alkylsulfate compounds; sodium dodecyl polyglycol ether sulfate; sodium sulforicinoleate; alkali metal salts of sulfonated paraffin, ammonium salts of sulfonated paraffin, and like alkyl sulfonates; sodium laurate, triethanolamine oleate, triethanolamine abietate, and like fatty acid salts; sodium benzene sulfonate, alkali metal sulfates of alkali phenol hydroxyethylene, and like alkylarylsulfonates; higher alkylnaphthalenesulfonates; naphthalenesulfonic acid-formalin condensates; dialkyl sulfosuccinates; polyoxyethylene alkylsulfates; and polyoxyethylene alkylarylsulfates.

Examples of the nonionic surfactants include $C_1$-$C_{18}$ alcohol-ethylene oxide and/or propylene oxide adducts; alkylphenol-ethylene oxide and/or propylene oxide adducts; and alkylene glycol and/or alkylene diamine-ethylene oxide and/or propylene oxide adducts.

Examples of $C_1$-$C_{18}$ alcohols forming the nonionic surfactants include methanol, ethanol, propanol, 2-propanol, butanol, 2-butanol, tertiary butanol, amyl alcohol, isoamyl alcohol, tertiary amyl alcohol, hexanol, octanol, decane alcohol, lauryl alcohol, myristyl alcohol, palmitylalcohol, and stearyl alcohol. Examples of alkylphenols include phenol, methylphenol, 2,4-di-tertiary butylphenol, 2,5-di-tertiary butylphenol, 3,5-di-tertiary butylphenol, 4-(1,3-tetramethylbutyl)phenol, 4-isooctylphenol, 4-nonylphenol, 4-tertiary octylphenol, 4-dodecylphenol, 2-(3,5-dimethylheptyl)phenol, 4-(3,5-dimethylheptyl)phenol, naphthol, bisphenol A, and bisphenol F. Examples of alkylene glycols include ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol, and 1,6-hexanediol. Examples of alkylene diamines include these alkylene glycols in which alcoholic hydroxy groups are substituted with amino groups. Further, the ethylene oxide and propylene oxide adducts may be random or block adducts.

Examples of the cationic surfactants include primary to tertiary amine salts, pyridinium salts, alkyl pyridinium salts, alkyl halide quaternary ammonium salts, and like quaternary ammonium salts.

Although these emulsifiers may be used in any amount with no particular limitation, the mass ratio of the emulsifier to the urethane resin is preferably in the range of 0.01:1 to 0.3:1, and more preferably 0.05:1 to 0.2:1. This is because when the emulsifier/urethane resin ratio is less than 0.05, the dispersibility may not be sufficient, whereas when the emulsifier/urethane resin ratio exceeds 0.3, the properties such as water resistance, strength, and elongation at break of the coating film obtained from the aqueous coating composition may be reduced.

Further, the solids content of the urethane resin emulsion (C) may be selected arbitrarily with no particular limitation. The solids content is preferably 10 to 50 mass % because the dispersibility and coating performance are good in that range, with 20 to 40 mass % being more preferable.

The weight average molecular weight of the urethane resin dispersed in the urethane resin emulsion (C) is preferably 2,000 to 50,000, and more preferably 3,000 to 40,000, in view of the smoothness of the resulting coating film. Further, the hydroxy value may also be selected arbitrarily with no particular limitation. The hydroxy value is expressed in consumption (mg) of KOH per gram of resin and is typically 0 to 100 mg KOH/g.

Oligomer (D)

In view of improving the coated surface smoothness of the multilayer coating film, the aqueous coating composition of the present invention may further contain an oligomer compound (excluding the acrylic resin (A)) that has a water tolerance of 10 or more, preferably 20 or more, and more preferably 50 or more, and a number average molecular weight of 200 to 1500, preferably 300 to 1000, and more preferably 400 to 1000.

Specific examples of the oligomer compound include polyalkylene glycols, such as polyethylene glycol and polypropylene glycol; and etherified products thereof.

Among these, hydroxy-containing oligomers are preferable, and polyoxypropylene glyceryl ether is particularly preferable.

Examples of commercially available products that can be used include GP400, GP600, and GP1000 (all manufactured by Sanyo Chemical Industries, Ltd.).

In the present invention, the water tolerance of the oligomer refers to a value obtained by the following measurement.

The water tolerance of the oligomer was determined by the following method. A 200-ml beaker having a diameter of 5 cm is charged with 5.0 g of a sample (oligomer). The sample is diluted with 50 ml of acetone. After the temperature of the sample solution is adjusted to 20° C., a newspaper having No. 4 type letters (i.e., 14-point characters) printed thereon is placed under the bottom of the beaker. Deionized water is dripped into the beaker, while stirring with a magnetic stirrer. The maximum amount (ml) of dripped deionized water allowing 14-point characters printed on the newspaper to be legible through the beaker when viewed from above the beaker is defined as the water tolerance.

A higher water tolerance value indicates a higher hydrophilicity of the oligomer.

Aqueous Coating Composition

The aqueous coating composition of the present invention is an aqueous coating composition containing an acrylic resin (A), a curing agent (B), and a urethane resin emulsion (C).

The term "aqueous coating composition" as used herein is used in contrast to "organic solvent-based coating composition", and generally means a coating composition in which a coating film-forming resin, a pigment, etc. are dispersed and/or dissolved in water, or in a medium mainly consisting of water (aqueous medium). The aqueous coating composition preferably contains water in an amount of about 10 to about 90 mass %, more preferably about 20 to about 80 mass %, and even more preferably about 30 to about 60 mass %.

The amounts of acrylic resin (A), curing agent (B), and urethane resin emulsion (C) in the aqueous coating composition are preferably as follows: the amount of acrylic resin (A) is 20 to 70 mass %, more preferably 30 to 65 mass %, and still more preferably 40 to 60 mass %; the amount of curing agent (B) is 5 to 20 mass %, more preferably 7.5 to 20 mass %, and still more preferably 10 to 20 mass %; the amount of urethane resin emulsion (C) is 10 to 50 mass %, more preferably 15 to 45 mass %, and still more preferably 20 to 40 mass %, based on the total amount of acrylic resin (A), curing agent (B), and urethane resin emulsion (C), on a solids basis. When an oligomer (D) is contained, the amount thereof is preferably, on a solids basis, 1 to 20 mass %, more preferably 3 to 17.5 mass %, and still more preferably 5 to 15 mass % based on the total amount of components (A), (B), (C), and (D).

The aqueous coating composition of the present invention may contain resins for modification, such as polyester resins, alkyd resins, silicon resins, fluororesins, and epoxy resins.

It is preferable that the aqueous coating composition further contains a pigment (E). Examples of the pigment (E) include coloring pigments (E1), extender pigments (E2), and luster pigments (E3). Such pigments can be used singly or in a combination of two or more.

When the aqueous coating composition contains a pigment (E), the amount of pigment (E) in the aqueous coating composition is typically 1 to 300 parts by mass, preferably 20 to 200 parts by mass, and more preferably 50 to 150 parts by mass, per 100 parts by mass of the total amount of the acrylic resin (A), crosslinking agent (B), and urethane resin emulsion (C), on a solids basis.

It is particularly preferable that the aqueous coating composition contains a coloring pigment (E1) and/or an extender pigment (E2), and that the total amount of the coloring pigment (E1) and the extender pigment (E2) in the aqueous coating composition is 40 to 300 parts by mass, more preferably 50 to 200 parts by mass, and even more preferably 60 to 150 parts by mass, per 100 parts by mass of the total amount of the acrylic resin (A), crosslinking agent (B), and urethane resin emulsion (C), on a solids basis.

Examples of the coloring pigment (E1) include titanium oxide, zinc flower, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, etc. Among these, titanium oxide and carbon black are preferable.

When the aqueous coating composition contains a coloring pigment (E1) as described above, the amount of coloring pigment (E1) is typically 1 to 300 parts by mass, preferably 3 to 200 parts by mass, and more preferably 5 to 150 parts by mass, per 100 parts by mass of the total amount of the acrylic resin (A), crosslinking agent (B), and urethane resin emulsion (C), on a solids basis.

Examples of the extender pigment (E2) include clay, kaolin, barium sulfate, barium carbonate, calcium carbonate, talc, silica, alumina white, and the like. Among these, barium sulfate and talc are preferable.

It is preferable that barium sulfate with an average primary particle size of 1 μm or less, more preferably 0.01 to 0.8 μm, be used as an extender pigment (E2) because a multilayer coating film with excellent smoothness can be obtained. It is also preferable that barium sulfate with an average primary particle size of 1 μm or less, more preferably 0.01 to 0.8 μm, be used as an extender pigment (E2), and the aqueous second colored coating composition (Y) described below contain a luster pigment (E3), because an excellent appearance, i.e., with a high flip-flop effect and little metallic mottling can be obtained.

The average primary particle diameter of barium sulfate as used herein is determined by observing barium sulfate using a scanning electron microscope, and averaging the maximum diameters of 20 barium sulfate particles on a straight line drawn at random on the electron microscope photograph.

When the aqueous coating composition contains an extender pigment (E2) as described above, the amount of extender pigment (E2) is typically 1 to 300 parts by mass, preferably 5 to 200 parts by mass, and more preferably 10 to 150 parts by mass, per 100 parts by mass of the total amount of the acrylic resin (A), crosslinking agent (B), and urethane resin emulsion (C), on a solids basis.

Examples of the luster pigment (E3) include aluminium (such as vapor-deposited aluminum), copper, zinc, brass, nickel, aluminium oxide, mica, titanium oxide- and/or iron oxide-coated aluminium oxide, titanium oxide- and/or iron oxide-coated mica, glass flakes, holographic pigments, etc. Such luster pigments (E3) can be used singly, or in a combination of two or more. Examples of aluminum pigments include non-leafing aluminum pigments and leafing aluminum pigments; any of the pigments can be used.

When the aqueous coating composition contains a luster pigment (E3) as described above, the amount of luster pigment (E3) in the aqueous coating composition is typically 1 to 50 parts by mass, preferably 2 to 30 parts by mass, and more preferably 3 to 20 parts by mass, per 100 parts by mass of the total amount of the acrylic resin (A), crosslinking agent (B), and urethane resin emulsion (C), on a solids basis.

The aqueous coating composition preferably further contains a hydrophobic solvent (F) in view of enhanced sagging resistance and popping resistance.

The hydrophobic solvent (F) is desirably an organic solvent of which a mass of 10 g or less, preferably 5 g or less, and more preferably 1 g or less, dissolves in 100 g of water at 20° C. Examples of the organic solvent include hydrocarbon solvents such as rubber solvents, mineral spirits, toluene, xylene, and solvent naphtha; alcoholic solvents such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, and propylene glycol monophenyl ether; ester solvents such as n-butyl acetate, isobutyl acetate, isoamyl acetate, methylamyl acetate, and ethylene glycol monobutyl ether acetate; ketone solvents such as methyl isobutyl ketone, cyclohexanone, ethyl n-amyl ketone, and diisobutyl ketone; etc. Such solvents can be used singly, or in a combination of two or more.

The hydrophobic solvent (F) is preferably an alcohol hydrophobic solvent in view of smoothness of the resulting coating film. $C_{7-14}$ hydrophobic alcoholic solvents are particularly preferable. It is more preferable to use at least one hydrophobic alcoholic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether.

When the aqueous coating composition contains a hydrophobic solvent (F) as mentioned above, the amount of hydrophobic solvent (F) is preferably 2 to 40 parts by mass, more preferably 5 to 35 parts by mass, and even more preferably 10 to 30 parts by mass, per 100 parts by mass of the total amount of the acrylic resin (A), crosslinking agent (B), and urethane resin emulsion (C), on a solids basis.

If necessary, the aqueous coating composition may contain additives for coating compositions, such as thickeners, UV absorbers, light stabilizers, curing catalysts, antifoaming agents, plasticizers, organic solvents other than the hydrophobic solvent (F), surface control agents, and antisettling agents.

Examples of thickeners include inorganic thickeners such as silicate, metal silicate, montmorillonite, and colloidal alumina; polyacrylic acid thickeners such as copolymers of (meth)acrylic acid and (meth)acrylic ester, and sodium polyacrylate; associative thickeners having a hydrophilic moiety and a hydrophobic moiety per molecule, and effectively enhancing the viscosity in an aqueous medium by adsorption of the hydrophobic moiety on the surface of a pigment or emulsion particles in a coating composition, or by association between hydrophobic moieties; cellulosic thickeners such as carboxymethylcellulose, methylcellulose, and hydroxyethylcellulose; protein thickeners such as casein, sodium caseinate, and ammonium caseinate; alginate thickeners such as sodium alginate; polyvinyl thickeners such as polyvinyl alcohol, polyvinylpyrrolidone, and polyvinyl benzyl ether copolymers; polyether thickeners such as Pluronic polyether, polyether dialkyl ester, polyether dialkyl ether, and polyether epoxy-modified products; maleic anhydride copolymer thickeners such as partial esters of vinyl methyl ether-maleic anhydride copolymers; polyamide thickeners such as polyamide amine; etc. Such thickeners can be used singly, or in a combination of two or more.

Examples of usable polyacrylic acid thickeners include commercially available products, which are available, for example, under the trade names "PRIMAL ASE-60", "PRIMAL TT-615", and "PRIMAL RM-5", manufactured by Rohm and Haas; "SN Thickener 613", "SN Thickener 618", "SN Thickener 630", "SN Thickener 634", and "SN Thickener 636", manufactured by San Nopco Ltd.; etc. Examples of usable associative thickeners include commercially available products, which are available, for example, under the trade names "UH-420", "UH-450", "UH-462", "UH-472", "UH-540", "UH-752", "UH-756VF", and "UH-814N", manufactured by ADEKA Co. Ltd.; "PRIMAL RM-8W", "PRIMAL RM-825", "PRIMAL RM-2020NPR", "PRIMAL RM-12W", and "PRIMAL SCT-275", manufactured by Rohm and Haas; "SN Thickener 612", "SN Thickener 621N", "SN Thickener 625N", "SN Thickener 627N", and "SN Thickener 660T", manufactured by San Nopco Ltd.; etc.

The thickener is preferably a polyacrylic acid thickener and/or an associative thickener, more preferably an associative thickener, and still more preferably a urethane associative thickener bearing a hydrophobic group at an end or ends and having a urethane bond in a molecular chain. Examples of usable urethane associative thickeners include commercially available products, which are available, for example, under the trade names "UH-420", "UH-462", "UH-472", "UH-540", "UH-752", "UH-756VF", and "UH-814N", manufactured by ADEKA Co. Ltd.; "SN thickener 612", "SN thickener 621N", "SN thickener 625N", "SN thickener 627N", and "SN thickener 660T", manufactured by San Nopco Ltd.; etc.

When the aqueous coating composition contains a thickener as described above, the amount of thickener is preferably 0.01 to 10 parts by mass, more preferably 0.02 to 3 parts by mass, and still more preferably 0.03 to 2 parts by mass, per 100 parts by mass of the total amount of the acrylic resin (A), crosslinking agent (B), and urethane resin emulsion (C), on a solids basis.

The aqueous coating composition can be prepared by mixing and dispersing, in an aqueous medium, an acrylic resin (A), a curing agent (B), and a urethane resin emulsion (C), together with, if necessary, an oligomer (D), a pigment (E), a hydrophobic solvent (F), and other additives for coating compositions, by using a known method. Examples of the aqueous medium include deionized water, and a mixture of deionized water and a hydrophilic organic solvent. Examples of the hydrophilic organic solvent include propylene glycol monomethyl ether, and the like.

Preferably, the solids content of the aqueous coating composition is typically 30 to 70 mass %, more preferably 35 to 60 mass %, and still more preferably 40 to 55 mass %.

The aqueous coating composition may be a single-liquid type or multi-liquid type coating composition. In view of storage stability, the aqueous coating composition may be prepared as a two-liquid type coating composition composed of a main agent containing an acrylic resin (A) and a urethane resin emulsion (C), and a curing agent containing a crosslinking agent (B).

In general, it is preferable that the main agent further contains a pigment and a solvent, and that the curing agent further contains a curing catalyst and a solvent. The curing agent may further contain a surfactant.

Before use, the coating composition may be diluted to an appropriate viscosity by adding water and/or an organic solvent, etc. if necessary, and then applied.

The appropriate viscosity may vary depending on the formulation of the coating composition, but is typically in the range of about 20 to about 60 seconds, and preferably about 25 to about 50 seconds, as adjusted and measured at 20° C. using Ford cup viscometer No. 4.

The aqueous coating composition can be applied on a substrate by known methods such as air spray coating, airless spray coating, rotary atomization coating, and curtain coating. An electrostatic charge may be applied during coating. Among these, air spray coating, rotary atomization coating, etc. are preferable. Such a coating method can be performed once or several times until the desired film thickness is obtained.

Preferably, the aqueous coating composition is typically applied to a cured film thickness of 5 to 40 μm, more preferably 7 to 30 μm, and still more preferably 10 to 25 μm.

The coating film of the aqueous coating composition can be cured, for example, by heating at 120 to 170° C., particularly 130 to 160° C., for 10 to 40 minutes. Heat-curing can be performed by known heating means, for example, by using hot air furnaces, electric furnaces, infrared induction heating furnaces, and like drying furnaces.

It is preferable that the coating film formed by the aqueous coating composition has a water swelling rate of not higher than 100% and an organic solvent swelling rate of not higher than 300% after pre-drying.

In the coating film formed by the aqueous coating composition, the water swelling rate is more preferably not higher than 60%, and even more preferably not higher than 20%; and the organic solvent swelling rate is more preferably not higher than 250%, and even more preferably not higher than 200%.

A second colored coating film with excellent smoothness can be formed on the coating film having a low water swelling rate. Further, the low organic solvent swelling rate of the coating film can prevent the coated surface smoothness from decreasing, which is caused by swelling of the coating film due to an organic solvent contained in the clear coating composition.

The "water swelling rate" and "water extraction rate" as used herein refer to values determined in the following manner.

First, a tin plate (50 mm×90 mm) degreased with isopropanol is weighed, and the weight is defined as a. The aqueous coating composition adjusted to a viscosity of 30 seconds as measured at 20° C. with Ford Cup No. 4 by adding deionized water is applied to the surface of the tin plate to a film thickness of 20 μm (when cured) by rotary atomization using an automatic coater. After being set in an air-conditioned booth (24° C., 68% RH), the coated plate is preheated at 80° C. for 3 minutes. The coated plate after preheating is weighed, and the weight is defined as b. The coated plate is then immersed in 20° C. deionized water for 3 minutes. After removing the coated plate from the deionized water, the deionized water is wiped from the coated plate with a rag. The coated plate is weighed, and the weight is defined as c. Subsequently, the coated plate is dried at 110° C. for 1 hour. The coated plate after cooling is weighed, and the weight is defined as d.

The values calculated by the following equations (1) and (2) are defined as the "water swelling rate" and "water extraction rate" as used herein.

$$\text{Water swelling rate (\%)} = [\{(c-a)/(d-a)\}-1] \times 100 \quad (1)$$

$$\text{Water extraction rate (\%)} = [1-\{(d-a)/(b-a)\}] \times 100 \quad (2)$$

The "organic solvent swelling rate" and "organic solvent extraction rate" as used herein are values determined in the following manner.

First, a tin plate (50 mm×90 mm) degreased with isopropanol is weighed, and the weight is defined as a. The aqueous coating composition adjusted to a viscosity of 30 seconds as measured at 20° C. with Ford Cup No. 4 by adding deionized water is applied to the surface of the tin plate to a film thickness of 20 μm (when cured) by rotary atomization using an automatic coater. After being set in an air-conditioned booth (24° C., 68% RH) for 3 minutes, the coated plate is preheated at 80° C. for 3 minutes. The coated plate after preheating is weighed, and the weight is defined as b. Subsequently, the coated plate is immersed in 20° C. organic solvent for 1 minute. After removing the coated plate from the organic solvent, the surface of the plate coated with the aqueous coating composition is not wiped, and the coated plate is stood upright on a rag to allow the solvent remaining on the surface of the coated plate to be absorbed in the rag for 30 seconds. The coated plate is weighed, and the weight is defined as c. Subsequently, the coated plate is dried at 110° C. for 1 hour. The coated plate after cooling is weighed, and the weight is defined as d.

The organic solvent used above is a mixed solvent of 3-ethoxyethyl propionate and butanol at a mixing ratio of 70:30 (parts by mass).

The values calculated according to the following equations (3) and (4) are defined as the "organic solvent swelling rate" and "organic solvent extraction rate" as used herein.

$$\text{Organic solvent swelling rate (\%)} = [\{(c-a)/(d-a)\}-1] \times 100 \quad (3)$$

$$\text{Organic solvent extraction rate (\%)} = [1-\{(d-a)/(b-a)\}] \times 100 \quad (4)$$

Method for Forming a Multilayer Coating Film

The method for forming a multilayer coating film of the present invention is a method comprising sequentially performing the following steps (1) to (4) on a substrate:

step (1): forming a first colored coating film by applying an aqueous first colored coating composition (X);

step (2): forming a second colored coating film by applying an aqueous second colored coating composition (Y) on the first colored coating film formed in step (1);

step (3): forming a clear coating film by applying a clear coating composition (Z) on the second colored coating film formed in step (2); and step (4): bake-drying the first colored coating film, the second colored coating film, and the clear coating film formed in steps (1) to (3) all at once, wherein the aqueous coating composition of the present invention is used as the aqueous first colored coating composition (X).

Step (1)

According to the method for forming a multilayer coating film of the present invention, first, the aqueous coating composition of the present invention is applied as the aqueous first colored coating composition (X) to a substrate.

Substrate

The substrate to be coated with the aqueous coating composition is not particularly limited. Examples of the substrate include exterior panel parts of automobile bodies such as passenger cars, trucks, motorcycles, and buses; automotive components such as bumpers; exterior panel parts of household electric appliances such as cellular phones and audio equipment; etc. Of these substrates, exterior panel parts of automobile bodies and automotive components are preferable.

The material for the substrate is not particularly limited. Examples of the material include metallic materials such as iron, aluminum, brass, copper, tin, stainless steel, galvanized steel, steel plated with zinc alloys (Zn—Al, Zn—Ni, Zn—Fe, etc.); plastic materials such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins and like resins, mixtures of these resins, and various types of fiber-reinforced plastics (FRP); inorganic materials such as glass, cement, and concrete; wood; textile materials such as paper and cloth; etc. Of these materials, metallic materials and plastic materials are preferable.

The substrate to be coated may be a metal material as described above or a vehicle body formed from such metal material, whose metal surface has been subjected to a surface treatment such as phosphate treatment, chromate treatment, composite oxide treatment, etc. The substrate may also be such metal material, vehicle body, or the like as described above on which a coating film is further formed.

Examples of the substrate having a coating film formed thereon include base materials whose surface is optionally treated and which have an undercoating film formed thereon. In particular, vehicle bodies having an undercoating film formed thereon using an electrodeposition coating composition are preferable, and those having an undercoating film formed thereon using a cationic electrodeposition coating composition are particularly preferable.

The substrate may be a plastic material as mentioned above or an automotive component (or part) formed from such plastic material, whose plastic surface has been surface-treated or coated with a primer, etc. The substrate may be a combination of the plastic and metallic materials mentioned above.

Step (2)

Subsequently, the aqueous second colored coating composition (Y) is applied to the coating layer of the aqueous first colored coating composition (X) (the first colored coating film) formed in Step (1).

Before application of the aqueous second colored coating composition (Y), the first colored coating film is preferably subjected to preheating (preliminary heating), air blowing, etc. under conditions in which the coating film is not substantially cured. In the present invention, the "cured coating film" indicates a film in a hardening drying state according to JIS K 5600-1-1, i.e., a film in a condition such that when the center of the coated surface is strongly pinched between the thumb and forefinger, no fingerprint impression is left on the coated surface and no shifting of the coating film is observed; or when the center of the coated surface is repeatedly quickly rubbed with a fingertip, no traces of rubbing are left on the coated surface. The "uncured coating film" indicates a film that has not yet reached a dry-hard state as mentioned above, and includes coating films in a touch free (dry to the touch) state and coating films in a semi-hardening drying state according to JIS K 5600-1-1.

The preheating temperature is preferably 40 to 120° C., more preferably 60 to 100° C., and still more preferably 70 to 90° C. The preheating time is preferably 30 seconds to 15 minutes, more preferably 1 to 12 minutes, and still more preferably 2 to 10 minutes. Air blowing can be typically performed by blowing either room temperature air, or air heated to 25 to 80° C., over the coated surface of the substrate for 30 seconds to 15 minutes.

Preferably, the first colored coating film is typically adjusted to a solids content of 60 to 100 mass %, more preferably 80 to 100 mass %, and still more preferably 90 to 100 mass %, by means of preheating, air blowing, etc., prior to the application of the aqueous second colored coating composition (Y).

The solids content of the coating film can be determined by the following method:

First, the aqueous first colored coating composition is simultaneously applied to a substrate and to an aluminum foil whose mass ($W_1$) has been measured in advance. After being subjected to preheating, etc., the coated aluminum foil is removed immediately before the application of the aqueous second colored coating composition (Y), and the mass ($W_2$) of the aluminium foil is measured. After the removed aluminum foil is dried at 110° C. for 60 minutes and allowed to cool to room temperature in a desiccator, the mass ($W_3$) of the aluminum foil is measured. The solids content is calculated according to the following equation.

Solids content mass %=$\{(W_3-W_1)/(W_2-W_1)\} \times 100$

The aqueous second colored coating composition (Y) applied to the first colored coating film is generally intended to impart an excellent appearance to the substrate to be coated. Usable as the coating composition (Y) are, for example, coating compositions prepared by dissolving or dispersing resin components comprising a base resin, such as an acrylic, polyester, alkyd, urethane or epoxy resin containing a crosslinkable functional group such as a carboxy or hydroxy group, and a curing agent such as a crosslinking agent (B) as mentioned above, together with a pigment and other additives, in water. Among these, thermosetting aqueous coating compositions containing a hydroxy-containing resin as the base resin and a melamine resin (b-1) as the crosslinking agent can be advantageously used in view of the appearance, water resistance, etc. of the resulting multilayer coating film.

The pigment may be a coloring pigment (E1), an extender pigment (E2), a luster pigment (E3), etc. It is particularly preferable that at least one of the pigments contained in the aqueous second colored coating composition (Y) is a coloring pigment (E1) and/or a luster pigment (E3).

Examples of the coloring pigment (E1) include titanium oxide, zinc flower, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, etc. as mentioned in the description of the aqueous coating composition.

It is preferable that when the aqueous second colored coating composition (Y) contains a coloring pigment (E1) as described above, the amount of coloring pigment (E1) is typically in the range of 1 to 150 parts by mass, more preferably 3 to 130 parts by mass, and even more preferably 5 to 110 parts by mass, per 100 parts by mass of the resin solids content in the aqueous second colored coating composition (Y).

Examples of the luster pigment (E3) include aluminum (for example, vapor-deposited aluminum), copper, zinc, brass, nickel, aluminum oxide, mica, titanium oxide- and/or iron oxide-coated aluminum oxide, titanium oxide- and/or iron oxide-coated mica, glass flakes, holographic pigments, etc. as mentioned in the description of the aqueous coating composition. Among these, aluminum, aluminum oxide, mica, titanium oxide- and/or iron oxide-coated aluminum oxide, and titanium oxide- and/or iron oxide-coated mica are more preferable; and aluminum is particularly preferable. Such luster pigments (E3) can be used singly, or in a combination of two or more.

The luster pigment (E3) is preferably in the form of flakes. As the luster pigment (E3), pigments having a longitudinal dimension of 1 to 100 μm, particularly 5 to 40 μm, and a thickness of 0.001 to 5 μm, particularly 0.01 to 2 μm, are suitable.

When the aqueous second colored coating composition (Y) contains a luster pigment (E3) as described above, it is suitable that the amount of luster pigment (E3) is typically in the range of 1 to 50 parts by mass, more preferably 2 to 30 parts by mass, and even more preferably 3 to 20 parts by mass, per 100 parts by mass of the resin solids in the aqueous second colored coating composition (Y).

The aqueous second colored coating composition (Y) preferably contains a hydrophobic solvent (F) as mentioned above. The hydrophobic solvent (F) is preferably an alcohol hydrophobic solvent in view of excellent brilliance of the resulting coating film. In particular, $C_{7-14}$ alcohol hydrophobic solvents, such as at least one alcohol hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether, are preferable.

When the aqueous second colored coating composition (Y) contains a hydrophobic solvent (F), the amount of hydrophobic solvent (F) is preferably 2 to 70 parts by mass, more preferably 11 to 60 parts by mass, and even more preferably 16 to 50 parts by mass, per 100 parts by mass of the resin solids content in the aqueous second colored coating composition (Y).

The aqueous second colored coating composition (Y) may further contain, if necessary, additives usually used for coating compositions, such as curing catalysts, thickeners, UV absorbers, light stabilizers, antifoaming agents, plasticizers, organic solvents, surface control agents, and antisettling agents. Such additives can be used singly, or in a combination of two or more.

The aqueous second colored coating composition (Y) can be applied by known methods such as air spray coating, airless spray coating, and rotary atomization coating. An electrostatic charge may be applied during coating. The coating composition can typically be applied to a cured film thickness of 5 to 30 μm, preferably 8 to 25 μm, and more preferably 10 to 20 μm.

Step (3)

In the method for forming a multilayer coating film of the present invention, a clear coating composition (Z) is applied to the coating layer of the aqueous second colored coating composition (Y) (the second colored coating film) formed in the above step (2).

Before the application of the clear coating composition (Z), the second colored coating film is preferably subjected to preheating, air blowing, etc. under conditions in which the coating film is not substantially cured. The preheating temperature is preferably 40 to 100° C., more preferably 50 to 90° C., and still more preferably 60 to 80° C. The preheating time is preferably 30 seconds to 15 minutes, more preferably 1 to 10 minutes, and still more preferably 2 to 5 minutes. Air blowing can be typically performed by blowing either room temperature air, or air heated to 25 to 80° C., over the coated surface of the substrate for 30 seconds to 15 minutes.

It is preferable that before the application of the clear coating composition (Z), the second colored coating film is typically adjusted to a solids content of 70 to 100 mass %, more preferably 80 to 100 mass %, and still more preferably 90 to 100 mass %, if necessary, by means of preheating, air blowing, etc. as mentioned above.

As the clear coating composition (Z), any known thermosetting clear coating composition for coating automobile bodies etc. can be used. Examples of such thermosetting clear coating compositions include organic solvent-type thermosetting coating compositions, aqueous thermosetting coating compositions, and powder thermosetting coating compositions, all of which contain a crosslinking agent and a base resin having a crosslinkable functional group.

Examples of the crosslinkable functional group contained in the base resin include carboxy, hydroxy, epoxy, silanol, etc. Examples of the base resin include acrylic resins, polyester resins, alkyd resins, urethane resins, epoxy resins, fluororesins, etc. Examples of the crosslinking agent include polyisocyanate compounds, blocked polyisocyanate compounds, melamine resins, urea resins, carboxy-containing compounds, carboxy-containing resins, epoxy-containing resins, epoxy-containing compounds, etc.

Examples of preferable combinations of base resin/crosslinking agent for the clear coating composition (Z) are carboxy-containing resin/epoxy-containing resin, hydroxy-containing resin/polyisocyanate compound, hydroxy-containing resin/blocked polyisocyanate compound, hydroxy-containing resin/melamine resin, etc.

The clear coating composition (Z) may be a single-liquid type coating composition, or a multi-liquid type coating composition such as a two-liquid type urethane resin coating composition.

If necessary, the clear coating composition (Z) may contain coloring pigments (E1), luster pigments (E3), dyes, etc., in amounts such that the transparency of the clear coating composition is not impaired; and may further contain extender pigments (E2), UV absorbers, light stabilizers, antifoaming agents, thickening agents, anticorrosives, surface control agents, etc.

The clear coating composition (Z) can be applied to the surface coated with the aqueous second colored coating composition (Y) by known methods, such as airless spray coating, air spray coating, and rotary atomization coating. An electrostatic charge may be applied during coating. The clear coating composition (Z) can typically be applied to a cured film thickness of 20 to 80 μm, preferably 25 to 60 μm, and more preferably 30 to 50 μm.

After application of the clear coating composition (Z), if necessary, an interval of about 1 to about 60 minutes may be placed at room temperature, or preheating may be performed at about 50 to about 110° C. for about 1 to about 30 minutes.
Step (4)

In the method for forming a multilayer coating film of the present invention, the uncured first colored coating film, uncured second coating film, and uncured clear coating film formed in Steps (1) to (3) are simultaneously heat-cured.

The first colored coating film, the second colored coating film, and the clear coating film are cured by a usual method for baking coating films, such as air-blowing, infrared heating, or high frequency heating. The heating temperature is preferably 80 to 180° C., more preferably 110 to 170° C., and still more preferably 130 to 160° C. The heating time is preferably 10 to 90 minutes, and more preferably 15 to 60 minutes. This heating allows the three layers for forming the multilayer coating film, i.e., the first colored coating film, second colored coating film, and clear coating film, to be simultaneously cured.

EXAMPLES

The present invention is described below in more detail with reference to Examples and Comparative Examples. However, the present invention is not limited to these examples. In the examples, "parts" and "%" are expressed on a mass basis. The thickness of the coating film refers to the thickness of the coating film when cured.

Production of a Hydroxy-Containing Acrylic Resin

Production Example 1

A reaction vessel equipped with a thermometer, a thermostat, a stirrer, a reflux condenser, a nitrogen inlet tube, and a dropper was charged with 30 parts of propylene glycol monopropyl ether. After the solvent was heated to 85° C., a mixture of 10 parts of styrene, 30 parts of methyl methacrylate, 15 parts of 2-ethylhexyl acrylate, 11.5 parts of n-butyl acrylate, 30 parts of hydroxyethyl acrylate, 3.5 parts of acrylic acid, 10 parts of propylene glycol monopropyl ether, and 2 parts of 2,2'-azobis(2,4-dimethylvaleronitrile) was added dropwise over a period of 4 hours, and aged for 1 hour after completion of the addition. A mixture of 5 parts of propylene glycol monopropyl ether and 1 part of 2,2'-azobis(2,4-dimethylvaleronitrile) was then added dropwise in a flask over 1 hour, and aged for 1 hour after completion of the addition. Further, 3.03 parts of 2-(dimethylamino)ethanol was added to the reaction mixture, and deionized water was gradually added to obtain a hydroxy-containing acrylic resin (A-1) solution with a solids content of 40%. The obtained hydroxy-containing acrylic resin had an acid value of 27 mg KOH/g and a hydroxy value of 145 mg KOH/g.

Production Example 2

A reaction vessel equipped with a thermometer, a thermostat, a stirrer, a reflux condenser, a nitrogen inlet tube and a dropper was charged with 130 parts of deionized water and 0.52 parts of "Aqualon KH-10" (trade name, a product of Dai-ichi Kogyo Seiyaku Co., Ltd., a polyoxyethylene alkyl ether sulfate ester ammonium salt, active ingredient: 97%). The mixture was stirred in a nitrogen stream, and heated to 80° C. Subsequently, a 1% quantity of the total amount of the monomer emulsion (1) shown below and 5.3 parts of a 6% aqueous ammonium persulfate solution were introduced into the reaction vessel, and the mixture was maintained at 80° C. for 15 minutes. Subsequently, the remainder of the monomer emulsion (1) was added dropwise over to the reaction vessel retained at the same temperature over a period of 3 hours, and the mixture was aged for 1 hour after completion of the addition.

Subsequently, the monomer emulsion (2) shown below was added dropwise over a period of 1 hour, and the mixture was aged for 1 hour. While 40 parts of a 5% aqueous 2-(dimethylamino)ethanol solution was gradually added into the reaction vessel, the mixture was cooled to 30° C., and then filtered with a 100-mesh nylon cloth to obtain, as a filtrate, a hydroxy-containing acrylic resin (A-2) dispersion with a solids content of 30% and an average particle diameter of 100 nm (as measured at 20° C. using a "COULTER N4" submicron particle size distribution analyzer (manufactured by Beckman Coulter, Inc.) in a state diluted with deionized water). The obtained hydroxy-containing acrylic resin had an acid value of 33 mg KOH/g, and a hydroxy value of 25 mg KOH/g.
Monomer emulsion (1): 42 parts of deionized water, 0.72 parts of "Aqualon KH-10", 2.1 parts of methylene bisacrylamide, 2.8 parts of styrene, 16.1 parts of methyl methacrylate, 28 parts of ethyl acrylate, and 21 parts of n-butyl acrylate were mixed and stirred to obtain a monomer emulsion (1).
Monomer emulsion (2): 18 parts of deionized water, 0.31 parts of "Aqualon KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed and stirred to obtain a monomer emulsion (2).

Production of a Urethane Resin Emulsion

Production Example 3

A reaction vessel equipped with a thermometer, a thermostat, a stirrer, a reflux condenser, and a water separator was charged with 67.2 parts of UMC (1/1) (a polycarbonate diol comprising 1,6-hexanediol and 1,4-cyclohexanedimethanol as diol components at a mixing ratio of 1:1, manufactured by Ube Industries, Ltd.) and 4.5 parts of dimethylolpropionic acid. The mixture was heated to 80° C. with stirring. After the temperature reached 80° C., 28.3 parts of dicyclohexylmethan-4,4'-diisocyanate was added dropwise over a period of 1 hour. After addition of 29.9 parts of N-methylpyrrolidone, the mixture was further aged at 80° C. to allow a urethanization reaction to proceed. When the isocyanate value became 3.0 or less, the heating was terminated, and 3.27 parts of triethylamine was added at 70° C.

Subsequently, while the mixture was maintained at 50° C., 200 parts of deionized water was added dropwise over a period of 1 hour to disperse the mixture in water. As a result, a urethane resin emulsion (C-1) was obtained.

The obtained urethane resin emulsion (C-1) had a solids content of 30%, a weight average molecular weight of 29,000, an acid value of 21 mg KOH/g, and an average particle size of 100 nm.

Production Examples 4 to 16

Urethane resin emulsions (C-2) to (C-14) were synthesized in the same manner as in Production Example 3 according to the formulations shown in Table 1.

In Table 1, (*1) to (*13) mean the following.

Urethane resin emulsions (C-11) to (C-14) are resins for Comparative Examples.

(*1) UMC (1/1): a polycarbonate diol comprising 1,6-hexanediol and 1,4-cyclohexanedimethanol as diol components at a mixing ratio of 1:1, manufactured by Ube Industries, Ltd.

(*2) UMC (3/1): a polycarbonate diol comprising 1,6-hexanediol and 1,4-cyclohexanedimethanol as diol components at a mixing ratio of 3:1, manufactured by Ube Industries, Ltd.

(*3) UMC (1/3): a polycarbonate diol comprising 1,6-hexanediol and 1,4-cyclohexanedimethanol as diol components at a mixing ratio of 1:3, manufactured by Ube Industries, Ltd.

(*4) UH100: a polycarbonate diol comprising 1,6-hexanediol as a diol component, manufactured by Ube Industries, Ltd.

(*5) UC100: a polycarbonate diol comprising 1,4-cyclohexanedimethanol as a diol component, manufactured by Ube Industries, Ltd.

(*6) PEG 1000: polyethyleneglycol, molecular weight 1000, manufactured by Sanyo Chemical Industries, Ltd.

(*7) DMPA: dimethylolpropionic acid (*8) 1,4-BD: 1,4-butanediol (*9) HMDI: hexamethylene diisocyanate (*10) IPDI: isophorone diisocyanate (*11) Hydrogenated MDI: dicyclohexylmethane-4,4'-diisocyanate

TABLE 1

| Production Example | Urethane resin emulsion (C) | UMC (1/1) *1 | UMC (3/1) *2 | UMC (1/3) *3 | UH 100 *4 | UC 100 *5 | PEG 1000 *6 | DMPA *7 | 1,4BD *8 | HMDI *9 | IPDI *10 | Hydrogenated MDI *11 | Mw | Acid value Mg KOH/g | Mean Particle Diameter nm |
|---|---|---|---|---|---|---|---|---|---|---|---|---|---|---|---|
| 3 | C-1 | 67.2 | | | | | | 4.5 | | | | 28.3 | 29000 | 21 | 100 |
| 4 | C-2 | 67.0 | | | | | | 4.4 | | | | 28.6 | 49000 | 21 | 100 |
| 5 | C-3 | 73.1 | | | | | | 4.8 | | | | 22.1 | 2700 | 23 | 92 |
| 6 | C-4 | | 67.2 | | | | | 4.5 | | | | 28.3 | 30000 | 21 | 100 |
| 7 | C-5 | | | 67.2 | | | | 4.5 | | | | 28.3 | 28000 | 21 | 100 |
| 8 | C-6 | | | | 67.2 | | | 4.5 | | | | 28.3 | 32000 | 21 | 100 |
| 9 | C-7 | | | | | 67.2 | | 4.5 | | | | 28.3 | 31000 | 21 | 100 |
| 10 | C-8 | 58.5 | | | | | | 4.5 | 7.7 | | | 29.3 | 31000 | 21 | 100 |
| 11 | C-9 | 37.0 | | | | | 30.2 | 4.5 | | | | 28.3 | 27000 | 21 | 100 |
| 12 | C-10 | 70.3 | | | | | | 4.7 | | | 25 | | 25000 | 22 | 95 |
| 13 | C-11 | 81.1 | | | | | | 5.4 | | | | 13.5 | 1200 | 25 | 83 |
| 14 | C-12 | 67.0 | | | | | | 4.4 | | | | 28.6 | 60000 | 21 | 100 |
| 15 | C-13 | 76.8 | | | | | | 4.6 | | 18.6 | | | 24000 | 22 | 97 |
| 16 | C-14 | 31.3 | | | | | 38.2 | 4.2 | | | | 26.3 | 26000 | 19 | 107 |

Production of an Aqueous Coating Composition (X)

Example 1

25.5 parts of the hydroxy-containing acrylic resin (A-1) solution (resin solids content: 10.2 parts) obtained in Production Example 1, 87 parts of rutile titanium dioxide (E1-1) (trade name "JR-806", manufactured by Tayca Corporation), 0.8 parts of carbon black (E1-2) (trade name "carbon MA-100", manufactured by Mitsubishi Chemical, Inc.), and 43 parts of deionized water were mixed, and adjusted to pH 8.0 with 2-(dimethylamino)ethanol. The resulting mixture was then dispersed by a paint shaker for 30 minutes to obtain a pigment-dispersed paste.

Subsequently, 156 parts of the obtained pigment-dispersed paste, 150 parts (resin solids content: 45 parts) of the hydroxy-containing acrylic resin (A-2) dispersion obtained in Production Example 2, 100 parts (resin solids content: 30 parts) of the urethane resin emulsion (C-1) obtained in Production Example 3, and 21.4 parts (resin solids content: 15 parts) of a melamine resin (B-1) (an imino group-containing methyl etherified melamine resin, weight average molecular weight: 800, solids content: 70%) were uniformly mixed.

Subsequently, ASE-60 (an alkaline swelling thickener, trade name, manufactured by Rohm & Haas Co.), 2-(dimethylamino)ethanol, and deionized water were added to the obtained mixture to obtain an aqueous coating composition (X-1) with a pH of 8.2, a coating solids content of 44%, a viscosity of 30 seconds as measured at 20° C. using Ford Cup No. 4. When the aqueous coating composition (X-1) was applied to a film thickness of 20 μm (when cured) and heated at 80° C. for 3 minutes, the resulting coating film had a water swelling rate of 20%, and an organic solvent (a mixed solvent of 3-ethoxyethyl propionate and butanol at a mixing ratio of 70:30 (parts by mass)) swelling rate of 180%.

Examples 2 to 12 and Comparative Examples 1 to 4

The procedure of Example 1 was repeated using the materials shown in Table 2 below as acrylic resins, melamine resin, blocked polyisocyanate compound, and urethane resin emulsions in the amounts shown in Table 2. As a result, aqueous coating compositions (X-2) to (X-16) with a pH of 8.2, a coating solids content of 44%, and a viscosity of 30 seconds as measured at 20° C. using Ford Cup No. 4 were obtained.

Desmodule BL3475 (diethyl malonate blocked hexamethylene diisocyanate, manufactured by Bayer Holding Ltd.) was used as the blocked polyisocyanate compound (B-3). GP600 (polyoxypropylenegryceline ether, molecular weight: 600, manufactured by Sanyo Chemical Industries, Ltd.) was used as the oligomer (D-1), and the water tolerance was 100 or more.

The amounts shown in Table 2 are on a solids basis.

TABLE 2

|  | Example | | | | | | | | |
|---|---|---|---|---|---|---|---|---|---|
|  | 1 | 2 | 3 | 4 | 5 | 6 | 7 | 8 | 9 |
| Aqueous coating composition X | 1 | 2 | 2 | 4 | 5 | 6 | 7 | 8 | 9 |
| Acrylic resin A-1 | 10 | 10 | 10 | 10 | 10 | 10 | 10 | 10 | 10 |
| Acrylic resin A-2 | 45 | 45 | 45 | 45 | 45 | 45 | 45 | 45 | 45 |
| Melamine resin B-1 | 15 | 15 | 15 | 15 | 15 | 15 | 15 | 15 | 15 |
| Blocked polyisocyanate B-3 | | | | | | | | | |
| Urethane resin emulsion C-1 | 30 | | | | | | | | |
| Urethane resin emulsion C-2 | | 30 | | | | | | | |
| Urethane resin emulsion C-3 | | | 30 | | | | | | |
| Urethane resin emulsion C-4 | | | | 30 | | | | | |
| Urethane resin emulsion C-5 | | | | | 30 | | | | |
| Urethane resin emulsion C-6 | | | | | | 30 | | | |
| Urethane resin emulsion C-7 | | | | | | | 30 | | |
| Urethane resin emulsion C-8 | | | | | | | | 30 | |
| Urethane resin emulsion C-9 | | | | | | | | | 30 |
| Urethane resin emulsion C-10 | | | | | | | | | |
| Urethane resin emulsion C-11 | | | | | | | | | |
| Urethane resin emulsion C-12 | | | | | | | | | |
| Urethane resin emulsion C-13 | | | | | | | | | |
| Urethane resin emulsion C-14 | | | | | | | | | |
| Oligomer D-1 | | | | | | | | | |
| Pigment | | | | | | | | | |
| Titanium dioxide (E1-1) | 87 | 87 | 87 | 87 | 87 | 87 | 87 | 87 | 87 |
| Carbon black (E2-2) | 0.8 | 0.8 | 0.8 | 0.8 | 0.8 | 0.8 | 0.8 | 0.8 | 0.8 |

|  | Example | | | Comparative Example | | | |
|---|---|---|---|---|---|---|---|
|  | 10 | 11 | 12 | 1 | 2 | 3 | 4 |
| Aqueous coating composition X | 10 | 11 | 12 | 13 | 14 | 15 | 16 |
| Acrylic resin A-1 | 10 | 10 | 10 | 10 | 10 | 10 | 10 |
| Acrylic resin A-2 | 45 | 40 | 35 | 45 | 45 | 45 | 45 |
| Melamine resin B-1 | 15 | | 15 | 15 | 15 | 15 | 15 |
| Blocked | | 20 | | | | | |

TABLE 2-continued

| | | | | | | | |
|---|---|---|---|---|---|---|---|
| polyisocyanate B-3 | | | | | | | |
| Urethane resin emulsion C-1 | 30 | 30 | | | | | |
| Urethane resin emulsion C-2 | | | | | | | |
| Urethane resin emulsion C-3 | | | | | | | |
| Urethane resin emulsion C-4 | | | | | | | |
| Urethane resin emulsion C-5 | | | | | | | |
| Urethane resin emulsion C-6 | | | | | | | |
| Urethane resin emulsion C-7 | | | | | | | |
| Urethane resin emulsion C-8 | | | | | | | |
| Urethane resin emulsion C-9 | | | | | | | |
| Urethane resin emulsion C-10 | 30 | | | | | | |
| Urethane resin emulsion C-11 | | 30 | | | | | |
| Urethane resin emulsion C-12 | | | 30 | | | | |
| Urethane resin emulsion C-13 | | | | 30 | | | |
| Urethane resin emulsion C-14 | | | | | 30 | | |
| Oligomer D-1 | | 10 | | | | | |
| Pigment | | | | | | | |
| Titanium dioxide (E1-1) | 87 | 87 | 87 | 87 | 87 | 87 | 87 |
| Carbon black (E2-2) | 0.8 | 0.8 | 0.8 | 0.8 | 0.8 | 0.8 | 0.8 |

Production of a Polyester Resin for Aqueous Second Colored Coating Composition (Y)

Production Example 17

A reaction vessel equipped with a thermometer, a thermostat, a stirrer, a reflux condenser, and a water separator was charged with 109 parts of trimethylolpropane, 141 parts of 1,6-hexanediol, 126 parts of hexahydrophthalic anhydride, and 120 parts of adipic acid. After the temperature was raised from 160 to 230° C. over a period of 3 hours, the mixture was subjected to a condensation reaction at 230° C. for 4 hours. Subsequently, 38.3 parts of trimellitic anhydride was further added in order to add carboxy groups to the resulting condensation reaction product, and reacted at 170° C. for 30 minutes. The reaction product was diluted with 2-ethyl-1-hexanol to obtain a polyester resin solution with a solids content of 70%. The obtained polyester resin had an acid value of 46 mg KOH/g, a hydroxy value of 150 mg KOH/g, and a weight average molecular weight of 6,400.

Production of a Luster Pigment Dispersion

Production Example 18

In a stirred mixing vessel, 19 parts of an aluminium pigment paste, (trade name "GX-180A", Asahi Kasei Metals Co., Ltd., metal content: 74%), 35 parts of 2-ethyl-1-hexanol, 8 parts of a phosphate group-containing resin solution (Note 1), and 0.2 parts of 2-(dimethylamino)ethanol were uniformly mixed to obtain a luster pigment dispersion.

(Note 1) Phosphate group-containing resin solution: a reaction vessel equipped with a thermometer, a thermostat, a stirrer, a reflux condenser, a nitrogen inlet tube, and a dropper was charged with a mixed solvent of 27.5 parts of methoxypropanol and 27.5 parts of isobutanol, and heated to 110° C. Subsequently, 121.5 parts of a mixture of 25 parts of styrene, 27.5 parts of n-butyl methacrylate, 20 parts of a branched higher alkyl acrylate (trade name "Isostearyl Acrylate", manufactured by Osaka Organic Chemical Industry, Ltd.), 7.5 parts of 4-hydroxybutyl acrylate, 15 parts of a phosphate group-containing polymerizable monomer (Note 2), 12.5 parts of 2-methacryloyloxyethyl acid phosphate, 10 parts of isobutanol, and 4 parts of tert-butylperoxyoctate was added to a mixed solvent over a period of 4 hours. Further, a mixture of 0.5 parts of tert-butylperoxyoctanoate and 20 parts of isopropanol was added dropwise over a period of 1 hour. Subsequently, the mixture was aged with stirring for 1 hour to obtain a phosphate group-containing resin solution with a solids content of 50%. The phosphate group-containing resin had an acid value attributable to phosphate groups of 83 mg KOH/g, a hydroxy value of 29 mg KOH/g, and a weight average molecular weight of 10,000.

(Note 2) Phosphate group-containing polymerizable monomer: a reaction vessel equipped with a thermometer, a thermostat, a stirrer, a reflux condenser, a nitrogen inlet tube, and a dropper was charged with 57.5 parts of monobutylphosphoric acid and 41 parts of isobutanol. After the mixture was heated to 90° C., 42.5 parts of glycidyl methacrylate was added dropwise over a period of 2 hours. After the mixture was aged with stirring for 1 hour, 59 parts of isopropanol was added to obtain a phosphate group-containing polymerizable monomer solution with a solids content of 50%. The obtained monomer had an acid value attributable to phosphate groups of 285 mg KOH/g.

Production of an Aqueous Second Colored Coating Composition (Y)

Production Example 19

100 parts of the hydroxy-containing acrylic resin dispersion (A-2) (solids content: 30 parts) obtained in Production Example 2, 57 parts of the polyester resin solution (solids content: 40 parts) obtained in Production Example 17, 62 parts of the luster pigment dispersion (resin solids content: 4 parts) obtained in Production Example 18, and 37.5 parts of a melamine resin (solids content: 30 parts) (trade name "Cymel 325", manufactured by Nihon Cytec Industries, Inc., solids content: 80%) were uniformly mixed. Further, a polyacrylic acid thickener (trade name "Primal ASE-60", manufactured by Rohm & Haas Co.), 2-(dimethylamino)ethanol, and deionized water were added to obtain an aqueous second colored coating composition (Y-1) with a pH of 8.0, a coating solids content of 25%, and a viscosity of 40 seconds as measured at 20° C. using Ford Cup No. 4.

Production of Test Plates

Test plates were prepared in the following manner by using the aqueous coating compositions (X-1) to (X-16) obtained in Examples 1 to 12 and Comparative Examples 1 to 4, and the aqueous second colored coating composition (Y-1) obtained in Production Example 19; the plates were then subjected to evaluation tests.

(Preparation of Test Substrates to be Coated)

A cationic electrodeposition coating composition (trade name "Electron GT-10", manufactured by Kansai Paint Co., Ltd.) was applied to zinc phosphate conversion-coated, cold-rolled steel plates by electrodeposition to a film thickness of 20 μm (when cured), and cured by heating at 170° C. for 30 minutes to provide test substrates to be coated.

Example 13

The aqueous coating composition (X-1) obtained in Example 1 was electrostatically applied to a test substrate to a film thickness of 20 μm (when cured) using a rotary atomizing electrostatic coating machine, then allowed to stand for 3 minutes, and preheated at 80° C. for 3 minutes. Subsequently, the aqueous second colored coating composition (Y-1) obtained in Production Example 19 was electrostatically applied to the uncured first colored coating film to a film thickness of 15 μm (when cured) using a rotary atomizing electrostatic coating machine. The coated substrate was allowed to stand for 5 minutes, and then preheated at 80° C. for 3 minutes. Subsequently, an acrylic resin solvent-based clear topcoat composition (trade name "MAGICRON KINO-1210", manufactured by Kansai Paint Co., Ltd.; hereinafter sometimes referred to as "clear coating composition (Z-1)"; the mixing ratio (mass ratio) of Solvesso 100/Solvesso 150/3-ethoxyethyl propionate/butanol/DBE used as solvents in the clear coating composition (Z-1) is 42/23/20/7.5/7.5 (Solvesso 100 and Solvesso 150: a petroleum aromatic mixed solvent, DBE: a mixed solvent of glutaric acid dimethyl, succinic acid dimethyl, and dimethyl adipate; manufactured by Du Pont) was electrostatically applied to the uncured second colored coating film to a film thickness of 35 μm (when cured). The coated substrate was allowed to stand for 7 minutes, and then heated at 140° C. for 30 minutes. A multilayer coating film consisting of the first colored coating film, the second colored coating film, and the clear coating film was thereby cured to provide a test plate.

Examples 14 to 24 and Comparative Examples 5 to 8

Test plates were obtained in the same manner as in Example 13, except that the aqueous coating compositions (X-2) to (X-16) shown in Table 2 were used in place of the aqueous coating composition (X-1) obtained in Example 1.

Evaluation Test

Test plates obtained in Examples 13 to 24 and Comparative Examples 5 to 8 were evaluated according to the test methods described below. A test was also performed for evaluating removability from a coating gun of each of the aqueous coating compositions (X-1)-(X-16).

(Test Methods)

Smoothness:

Smoothness was evaluated based on Wc value measured using "Wave Scan DOI" (manufactured by BYK Gardner). The smaller the Wc value, the greater the smoothness of the coated surface. The smoothness is good when WC is 10 or less.

Removability from a Coating Gun:

Each aqueous first colored coating composition was ejected for 10 seconds using a G1 Copes Bell (rotation speed: 30,000/min, shaping air pressure: 4.0 kg/cm$^2$, paint flow rate: 200 cc/min, manufactured by ABB), and allowed to stand for 50 seconds. This procedure was repeated 10 times, and cleaning water (water/ethylene glycol butyl ether/isopropanol/dimethyl ethanol amine)=90/5/4/1 (mass ratio)) was ejected for 2 seconds. The condition of the coating composition remaining on the groove of the bell was evaluated.

O: No coating composition remained on the groove of the bell.

X: The coating composition remained on the groove of the bell.

Table 3 below shows the removability from a bell of the coating compositions obtained in the Examples and Comparative Examples, and the water swelling rate and organic solvent swelling rate of the first colored coating film, as well as the above test results.

TABLE 3

| | Example | | | | | | | | | | | | Comparative Example | | | |
|---|---|---|---|---|---|---|---|---|---|---|---|---|---|---|---|---|
| | 13 | 14 | 15 | 16 | 17 | 18 | 19 | 20 | 21 | 22 | 23 | 24 | 5 | 6 | 7 | 8 |
| Aqueous coating composition X | 1 | 2 | 3 | 4 | 5 | 6 | 7 | 8 | 9 | 10 | 11 | 12 | 13 | 14 | 15 | 16 |
| Removability from a coating gun | O | O | O | O | O | O | O | O | O | O | O | O | O | X | O | O |
| First colored coating film | | | | | | | | | | | | | | | | |
| Water swelling rate (%) | 20 | 16 | 45 | 17 | 23 | 22 | 18 | 38 | 53 | 31 | 22 | 33 | 115 | 15 | 85 | 65 |
| Organic solvent swelling rate (%) | 180 | 190 | 275 | 193 | 171 | 188 | 193 | 235 | 256 | 248 | 198 | 226 | 345 | 203 | 305 | 290 |

TABLE 3-continued

|  | Example | | | | | | | | | | | | Comparative Example | | | |
| --- | --- | --- | --- | --- | --- | --- | --- | --- | --- | --- | --- | --- | --- | --- | --- | --- |
|  | 13 | 14 | 15 | 16 | 17 | 18 | 19 | 20 | 21 | 22 | 23 | 24 | 5 | 6 | 7 | 8 |
| Multilayer coating film | | | | | | | | | | | | | | | | |
| Smoothness (Wc) | 8 | 7 | 9 | 7 | 8 | 9 | 9 | 8 | 9 | 8 | 7 | 7 | 13 | 8 | 12 | 12 |

The invention claimed is:

1. An aqueous coating composition comprising:
an acrylic resin (A);
a curing agent (B); and
a urethane resin emulsion (C) with a weight average molecular weight of 2,000 to 50,000, the urethane resin emulsion (C) being prepared with a polyisocyanate component and a polyol component as starting materials;
the polyisocyanate component comprising an alicyclic diisocyanate, and
the polyol component comprising a polycarbonate diol in an amount of 50 mass % or more, based on a total amount of the polyol component,
wherein the polycarbonate diol is obtained by reacting a diol component and a carbonylating agent; the diol component comprises a diol having 6 or more carbon atoms in an amount of 90 mass % or more, based on a total amount of the diol component; and the diol having 6 or more carbon atoms comprises a cycloalkylene group-containing alicyclic diol having 6 or more carbon atoms.

2. The aqueous coating composition according to claim 1, wherein the acrylic resin (A) comprises a copolymer obtained by emulsion polymerization of a polymerizable unsaturated monomer mixture containing an alkyl (meth)acrylate monomer in an amount of 30 to 80 mass %, based on a total amount of the polymerizable unsaturated monomer mixture, and
wherein the alkyl group of the alkyl (meth)acrylate monomer having 4 to 14 carbon atoms.

3. The aqueous coating composition according to claim 1, wherein the curing agent (B) is at least one member selected from the group consisting of melamine resins (b-1), polyisocyanate compounds (b-2), blocked polyisocyanate compounds (b-3), and carbodiimide group-containing compounds (b-4).

4. The aqueous coating composition according to claim 1, wherein proportions of a solids content of the acrylic resin (A), curing agent (B), and urethane resin emulsion (C) are 20 to 70 mass % of the acrylic resin (A), 5 to 20 mass % of the curing agent (B), and 10 to 50 mass % of the urethane resin emulsion (C), based on a total amount of the solids content of the acrylic resin (A), the curing agent (B), and the resin emulsion (C).

5. The aqueous coating composition according to claim 1, further comprising an oligomer (D) having a water tolerance of 10 ml or more, and a number average molecular weight of 200 to 1,500.

6. The aqueous coating composition according to claim 1, wherein a coating film formed with the aqueous coating composition has a water-swelling rate of 100% or less, and has an organic solvent-swelling rate of 300% or less.

7. An article coated with the aqueous coating composition of claim 1.

8. A method for forming a multilayer coating film, comprising sequentially performing the following steps (1) to (4) on a substrate:
step (1): forming a first colored coating film by applying an aqueous first colored coating composition (X);
step (2): forming a second colored coating film by applying an aqueous second colored coating composition (Y) to the first colored coating film formed in step (1);
step (3): forming a clear coating film by applying a clear coating composition (Z) to the second colored coating film formed in step (2); and
step (4): bake-drying the first colored coating film, the second colored coating film, and the clear coating film formed in steps (1) to (3) all at once,
wherein the aqueous first colored coating composition (X) is the aqueous coating composition of claim 1.

9. An article coated by the method of claim 8.

* * * * *